(12) United States Patent
Haq et al.

(10) Patent No.: US 10,099,458 B2
(45) Date of Patent: Oct. 16, 2018

(54) REVERSIBLE ADHESIVE COMPOSITIONS AND RELATED METHODS

(71) Applicant: BOARD OF TRUSTEES OF MICHIGAN STATE UNIVERSITY, East Lansing, MI (US)

(72) Inventors: Mahmoodul Haq, Okemos, MI (US); Lawrence T. Drzal, Okemos, MI (US); Ermias G. Koricho, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 162 days.

(21) Appl. No.: 15/078,333

(22) Filed: Mar. 23, 2016

(65) Prior Publication Data
US 2016/0284449 A1  Sep. 29, 2016

Related U.S. Application Data

(60) Provisional application No. 62/137,023, filed on Mar. 23, 2015.

(51) Int. Cl.
*B32B 27/08* (2006.01)
*B32B 27/34* (2006.01)
(Continued)

(52) U.S. Cl.
CPC ............ *B32B 27/34* (2013.01); *B29C 65/148* (2013.01); *B29C 65/1425* (2013.01);
(Continued)

(58) Field of Classification Search
USPC .................. 156/94, 247, 249, 701, 711, 712
See application file for complete search history.

(56) References Cited

U.S. PATENT DOCUMENTS

| | | | | |
|---|---|---|---|---|
| 5,338,611 A | * | 8/1994 | Lause | B29C 65/1425 156/272.2 |
| 2005/0274454 A1 | * | 12/2005 | Extrand | C09J 5/00 156/272.4 |
| 2010/0273008 A1 | * | 10/2010 | Burckhardt | C08G 18/10 428/423.1 |

OTHER PUBLICATIONS

Haq, Koricho, Khomenko, Gerth, and Drzal, "Tailorable Adhesives for Multi-Material Joining, Facile Repair and Re-Assembly," Presented at the American Society of Composites Conference 2015—30th Annual Technical Conference; Sep. 28-30, 2015; East Lansing, MI (11 pages).

(Continued)

*Primary Examiner* — Sing P Chan
(74) *Attorney, Agent, or Firm* — Marshall, Gerstein & Borun LLP

(57) ABSTRACT

The disclosure relates to reversible bonded structural joints using active adhesive compositions that can allow for disassembly, repair, and re-assembly. The disclosure is particularly directed to the adhesive composition material, irrespective of the type of the substrate(s) being joined. The adhesive composition can include any thermoplastic adhesive material that can be remotely activated for targeted heating of just the adhesive composition (e.g., and not the surrounding substrates being joined) via the inclusion of electromagnetically excitable particles in the adhesive composition. The substrates can be any metal material, any composite material, any hybrid material, or otherwise. The disclosed adhesive compositions allow for recyclability of parts at the end of their lifetime and repair/replacement of parts during their lifetime.

26 Claims, 10 Drawing Sheets

(51) Int. Cl.

| | | |
|---|---|---|
| *B32B 27/38* | (2006.01) | |
| *B29C 65/14* | (2006.01) | |
| *B29C 65/36* | (2006.01) | |
| *B29C 65/00* | (2006.01) | |
| *B29C 65/48* | (2006.01) | |
| *B29C 65/56* | (2006.01) | |
| *B29C 65/76* | (2006.01) | |
| *B29C 65/82* | (2006.01) | |
| *C08K 3/04* | (2006.01) | |
| *C08K 3/08* | (2006.01) | |
| *C08K 3/22* | (2006.01) | |
| *C08K 7/06* | (2006.01) | |
| *C08K 7/18* | (2006.01) | |
| *C08K 9/02* | (2006.01) | |
| *C09J 177/02* | (2006.01) | |
| *H01F 1/14* | (2006.01) | |
| *B29C 65/50* | (2006.01) | |
| *H01F 1/44* | (2006.01) | |
| *F16B 11/00* | (2006.01) | |
| *B29L 31/30* | (2006.01) | |
| *B29K 105/16* | (2006.01) | |

(52) U.S. Cl.
CPC ........ *B29C 65/368* (2013.01); *B29C 65/3612* (2013.01); *B29C 65/3696* (2013.01); *B29C 65/489* (2013.01); *B29C 65/4815* (2013.01); *B29C 65/4855* (2013.01); *B29C 65/4875* (2013.01); *B29C 65/4885* (2013.01); *B29C 65/5071* (2013.01); *B29C 65/5085* (2013.01); *B29C 65/76* (2013.01); *B29C 65/8207* (2013.01); *B29C 66/112* (2013.01); *B29C 66/1122* (2013.01); *B29C 66/1142* (2013.01); *B29C 66/1162* (2013.01); *B29C 66/1222* (2013.01); *B29C 66/1224* (2013.01); *B29C 66/12441* (2013.01); *B29C 66/131* (2013.01); *B29C 66/14* (2013.01); *B29C 66/43* (2013.01); *B29C 66/43441* (2013.01); *B29C 66/721* (2013.01); *B29C 66/7212* (2013.01); *B29C 66/742* (2013.01); *B29C 66/7422* (2013.01); *B29C 66/74283* (2013.01); *B29C 66/8322* (2013.01); *B29C 66/83221* (2013.01); *B29C 66/919* (2013.01); *B32B 27/08* (2013.01); *B32B 27/38* (2013.01); *C08K 3/04* (2013.01); *C08K 3/041* (2017.05); *C08K 3/042* (2017.05); *C08K 3/046* (2017.05); *C08K 3/08* (2013.01); *C08K 3/22* (2013.01); *C08K 7/06* (2013.01); *C08K 7/18* (2013.01); *C08K 9/02* (2013.01); *C09J 177/02* (2013.01); *H01F 1/447* (2013.01); *B29C 66/30326* (2013.01); *B29C 66/322* (2013.01); *B29C 66/71* (2013.01); *B29C 66/7392* (2013.01); *B29C 66/7394* (2013.01); *B29K 2105/162* (2013.01); *B29L 2031/30* (2013.01); *B29L 2031/3076* (2013.01); *C08K 2003/2227* (2013.01); *C08K 2201/01* (2013.01); *F16B 11/006* (2013.01)

(56) References Cited

OTHER PUBLICATIONS

Koricho, Khomenko, and Haq, "Development of Reversible Bonded Joints Using Nano-Ferromagnetic Particles," Presented at the American Society of Composites Conference 2015—30th Annual Technical Conference; Sep. 28-30, 2015; East Lansing, MI (10 pages).

Haq, Drzal, and Koricho, "Efficient Assembly and Joining: Reversible Bonded Joints Using Nano-ferromagnetic Particles," presented on Mar. 24, 2015 at the Society of Plastics Engineers (SPE) Annual Technical Conference (ANTEC) 2015; Mar. 23-25, 2015; Orlando, FL (17 pages).

\* cited by examiner

REVERSIBLE ADHESIVE COMPOSITIONS AND RELATED METHODS

CROSS REFERENCE TO RELATED APPLICATION

Priority is claimed to U.S. Provisional Application No. 62/137,023 (filed Mar. 23, 2015), which is incorporated herein by reference in its entirety.

STATEMENT OF GOVERNMENT INTEREST

This invention was made with government support under DE-EE0006424 awarded by the U.S. Department of Energy. The government has certain rights in the invention.

BACKGROUND OF THE DISCLOSURE

Lightweight and reliable dissimilar material joining is of special interest in automotive, aerospace, defense and marine industries. Conventional and well-established methods for dissimilar materials joining include friction stir welding (FSW), ultrasonic welding, arc welding, laser welding, plasma welding, explosive welding/bonding using chemical explosives, conventional brazing or soldering, rivets, bolts, and other conventional mechanical fasteners, conventional adhesive joining. However, each of those techniques has its own advantages and drawbacks.

Friction stir welding (FSW) is widely used. The solid-state nature of FSW leads to a number of advantages over fusion welding methods since porosity, solute redistribution, solidification cracking and liquidation cracking do not arise during FSW. Nevertheless, FSW has many inherent limitations as it cannot efficiently join metals-to-composites. Plus, the weld material usually does not accommodate large deformations due to insufficient weld temperatures and may lead to tunnel-like defects. A so-called "kissing bond" is also a common defect due to minimal contact between materials. Finally, lack-of-penetration defects due to reduced length of the pin can be a potential for fatigue cracks.

Ultrasonic welding is a well-established technique for joining both hard and soft materials, such as semi-crystalline plastics, and metals. But it does not allow for joining of thick materials, making it difficult to join metals. Arc welding, another joining technique, is an important process for the fabrication of steel structures and vehicles. Since only metals can be welded, dissimilar material joining with fiber-reinforced polymer (FRP) composites is not possible. Plus metallic corrosion in the weld area is a big concern. Other types of welding such as laser welding, plasma welding, explosive welding/bonding using chemical explosives, conventional brazing or soldering all share a common limitation of an inability to join FRP composites.

Bolted joints or hybrid bolted/bonded joints are still the dominant fastening mechanisms used in joining of primary structural parts made from advanced composites. Mechanical fasteners offer the advantage of being able to be removed without destroying the structure and they are not sensitive to surface preparation, service temperature, or humidity. On the other hand, bolts increase the weight of the resulting joint and create potential sources of stress concentration within the joint. The drilling of holes in laminated composites creates the serious problem of delamination in the joint, plus the clearance of the hole and the bolt can lead to bolt-adherent slip which is a major concern in load re-distribution and stability of resulting components.

Adhesively bonded joints are gaining popularity in place of conventional fasteners as they provide light-weight designs, reduce stress concentrations, enable joining of dissimilar materials, and are often cheaper than conventional fasteners. Bonded joints provide larger contact area than bolted joints thereby providing efficient stress distribution, enabling higher efficiency and improved fatigue life. Nevertheless, the quality of adhesively bonded joints depends on various factors including manufacturing techniques, manufacturing defects, physical damage and deterioration due to accidental impacts, moisture absorption, improper handling, etc. These factors can significantly affect the strength of resulting bonded joints leading to an increased need for a successful monitoring technique that can provide information about the adhesive layer and its resulting joint. Moreover, the resulting joint cannot be disassembled or reassembled.

The use of thermoplastic adhesives for bonded joints is promising for re-assembly/repair, but the energy required to heat the entire adhesive area limits the feasibility of this technique. The heat is generally applied through the adherends and is infeasible in non-metallic adherends.

SUMMARY

As noted, joining dissimilar materials is a critical technical barrier to weight reduction of both civilian and military vehicles, however breakthrough ideas for methods to produce these joints are lacking and have their own limitations. The disclosed reversible adhesive composition addresses these limitations and has potential for direct industrial implementation with minimal to negligible change in current industrial practices.

The disclosure relates to reversible bonded structural joints using active adhesives that can allow for dis-assembly, repair, and re-assembly. This will allow for recyclability of parts at the end of their lifetime. Currently recyclability, in-situ repair and re-assembly are of utmost priority in automotive and structural applications. The disclosure is particularly directed to the adhesive composition material, irrespective of the type of the substrate(s) being joined. The substrate can either be any metal material (e.g., aluminum, steel, magnesium, etc.), any composite material (e.g., carbon fiber-reinforced polymer (CFRP), glass fiber-reinforced polymer (GRFP)), any hybrid material (e.g., multi-materials), or otherwise. Secondly, the adhesive composition can include any thermoplastic material (such as nylon, ABS, etc.) that can be modified such that it can be remotely activated for targeted heating of just the adhesive composition (e.g., without directly heating the surrounding substrates being joined, although indirect conduction heating of the substrates is possible at a lower rate).

In one aspect, the disclosure relates to an adhesive composition comprising: (a) a thermoplastic polymer matrix; and (b) electromagnetically excitable particles distributed throughout the thermoplastic polymer matrix.

Various refinements of the thermoplastic polymer matrix are possible. In a refinement, the thermoplastic polymer is selected from the group consisting of polyamides, polyesters, polyurethanes, acrylonitrile-butadiene-styrene (ABS) copolymers, styrene block copolymers, polycarbonates, polyolefins, ethylene-vinyl acetate copolymers, ethylene-acrylate copolymers, and combinations thereof. In another refinement, the thermoplastic polymer is in a solid state at a temperature ranging from 20° C. to 30° C. In another refinement, the thermoplastic polymer is present in the adhesive composition in an amount ranging from 50 wt. % to 99.9 wt. %.

Various refinements of the electromagnetically excitable particles are possible. In a refinement, the electromagnetically excitable particles comprise one or more of a carbon material and a metallic material. In another refinement, the electromagnetically excitable particles comprise at least one carbon material and at least one metallic material. In another refinement, the electromagnetically excitable particles are selected from the group consisting of ferromagnetic nanoparticles, graphene nanoplatelets, alumina nanoparticles, metal-doped graphene microparticles, metal-doped graphene nanoparticles, and combinations thereof. In another refinement, the electromagnetically excitable particles comprise carbon, for example being selected from the group consisting of graphite particles, exfoliated graphite nanoplatelets, carbon nanotubes, carbon fibers, carbon black, and combinations thereof. In another refinement, the electromagnetically excitable particles comprise ferromagnetic nanoparticles. In another refinement, the electromagnetically excitable particles are present in the adhesive composition in an amount ranging from 0.1 wt. % to 20 wt. %. In another refinement, the electromagnetically excitable particles comprise nanoparticles having a size ranging from 1 nm to 1000 nm. In another refinement, the electromagnetically excitable particles comprise microparticles having a size ranging from 1 μm to 100 μm. In another refinement, the electromagnetically excitable particles comprise a chemical functionalization moiety for compatibilization with the thermoplastic polymer matrix.

In some embodiments, adhesive composition further comprises (c) one or more additives selected from the group consisting of tackifying resins, waxes, plasticizers, antioxidants, ultraviolet stabilizers, colorants, biocides, flame retardants, antistatic agents, fillers, and combinations thereof. In a refinement, the additives are present in the adhesive composition in an amount ranging from 0.5 wt. % to 40 wt. %.

In another aspect, the disclosure relates to a method for assembling a part, the method comprising: (a) contacting the adhesive composition according to any of it variously disclosed embodiments with a first surface and a second surface at a joint interface of a part to be assembled; (b) directing electromagnetic radiation to the adhesive composition to heat the adhesive composition and to transform the adhesive composition to flowable or moldable state; and (c) removing the electromagnetic radiation and cooling the adhesive composition, thereby transforming the adhesive composition to a solid state in contact with and bonded to the first surface and the second surface at the joint interface.

Various refinements of the assembly method are possible. In a refinement, (i) the electromagnetically excitable particles comprise a carbon material; and (ii) the electromagnetic radiation comprises microwave radiation. In another refinement, (i) the electromagnetically excitable particles comprise a metallic material; and (ii) the electromagnetic radiation comprises a variable magnetic field generating electromagnetic induction. In another refinement, (i) the electromagnetically excitable particles comprise at least one a carbon material and at least one metallic material; and (ii) the electromagnetic radiation comprises at least one of microwave radiation and a variable magnetic field generating electromagnetic induction. In another refinement, the method further comprises heating the adhesive composition to a limited degree sufficient avoid or prevent heat-induced damage to one or both of the first surface (or substrate) and the second surface (or substrate). In another refinement, the method further comprises applying pressure to one or both of the first surface and the second surface when heating the adhesive composition, thereby causing the thermoplastic polymer to expand and contact an increased surface area at the joint interface. In another refinement, the method further comprises placing one or more spacers between the first surface (or first substrate) and the second surface (or second substrate), the spacers maintaining a constant specified separation distance between the first surface and the second surface.

In another aspect, the disclosure relates to a method for disassembling a part, the method comprising: (a) providing an assembled part comprising the adhesive composition according to any of the disclosed embodiments in a solid state and in contact with and bonded to a first surface and a second surface at a joint interface of the assembled part; (b) directing electromagnetic radiation to the adhesive composition to heat the adhesive composition and to transform the adhesive composition to a flowable or moldable state; and (c) separating the first surface from the second surface.

Various refinements of the disassembly method are possible. In a refinement, the method further comprises: (d) performing the foregoing assembly method to re-bond the first surface and the second surface at the joint interface. In another refinement, the method further comprises (d) providing a third surface (or third substrate) as a replacement for the second surface (or second substrate); and (e) performing the foregoing assembly method to bond the first surface and the third surface at the joint interface. For example, the third surface (or corresponding third substrate) can have the same shape and/or is formed from the same material as the second surface (or second substrate). In another refinement, (i) the electromagnetically excitable particles comprise a carbon material; and (ii) the electromagnetic radiation comprises microwave radiation. In another refinement, (i) the electromagnetically excitable particles comprise a metallic material; and (ii) the electromagnetic radiation comprises a variable magnetic field generating electromagnetic induction. In another refinement, (i) the electromagnetically excitable particles comprise at least one a carbon material and at least one metallic material; and (ii) the electromagnetic radiation comprises at least one of microwave radiation and a variable magnetic field generating electromagnetic induction (e.g., two types of particles are present to allow type of remote heating, where either or both methods can be used as desired and as appropriate for the surrounding substrate materials). In another refinement, (i) the first surface is a surface of a first substrate; (ii) the second surface is a surface of a second substrate separate from the first substrate (e.g., similarly for the third surface/third substrate. the first surface and the second surface are surfaces of a single substrate. In another refinement, the first surface (or first substrate) and the second surface (or second substrate) are formed from different materials. In another refinement, the first surface (or first substrate) comprises a metal material, and the second surface (or second substrate) comprises a polymeric material (e.g., similarly for the third surface/third substrate).

In another aspect, the disclosure relates to a method for repairing a part, the method comprising: (a) providing an assembled part comprising the adhesive composition according to any of the disclosed embodiments in a solid state and in contact with and bonded to a first surface and a second surface at a joint interface of the assembled part, wherein the assembled part further comprises one or more defects at the joint interface; (b) directing electromagnetic radiation to the adhesive composition to heat the adhesive composition and to transform the adhesive composition to flowable or moldable state, thereby allowing the adhesive composition to flow at least partially into the one or more defects; and (c) removing the electromagnetic radiation and cooling the adhesive composition, thereby transforming the adhesive composition to a solid state in contact with and bonded to the first surface, the second surface, and the one or more defects at the joint interface.

Various refinements of the repair method are possible. In a refinement, the method further comprises applying pressure to one or both of the first surface and the second surface when heating the adhesive composition, thereby causing the thermoplastic polymer (i) to expand and contact an increased surface area at the joint interface and (ii) to flow at least partially into the one or more defects. In another refinement, (i) the electromagnetically excitable particles comprise a carbon material; and (ii) the electromagnetic radiation comprises microwave radiation. In another refinement, (i) the electromagnetically excitable particles comprise a metallic material; and (ii) the electromagnetic radiation comprises a variable magnetic field generating electromagnetic induction.

In another aspect, the disclosure relates to an assembled part comprising the adhesive composition according to any of its various disclosed embodiments in a solid state and in contact with and bonded to a first surface and a second surface at a joint interface of the assembled part. In a refinement, the first surface (or first substrate) and the second surface (or second substrate) are bonded at a joint interface selected from the group consisting of a lap joint, a double-lap joint, a butt joint, a scarf joint, a corner/L-joint, and a T-/Pi-joint. In another refinement, the assembled part is a vehicle component part (e.g., two separate structural surfaces/substrates joined as a component of an automobile, a military vehicle, an airplane, etc.).

Various refinements of the different methods and corresponding assembled/disassembled parts are possible. In a refinement, (i) the first surface is a surface of a first substrate; (ii) the second surface (or third surface) is a surface of a second substrate (or third substrate) separate from the first substrate. In another refinement, the first surface and the second surface are surfaces of a single substrate. In another refinement, the first surface (or first substrate) and the second surface (or second substrate) or third surface (or third substrate) are formed from different materials. For example, the first surface (or first substrate) can comprise a metal material, and the second surface (or second substrate) or third surface (or third substrate) can comprise a polymeric material and/or a non-metallic material. In another refinement, the first surface (or first substrate) and the second surface (or second substrate) or third surface (or third substrate) are bonded at a joint interface selected from the group consisting of a lap joint, a double-lap joint, a butt joint, a scarf joint, a corner/L-joint, and a T-/Pi-joint.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1:
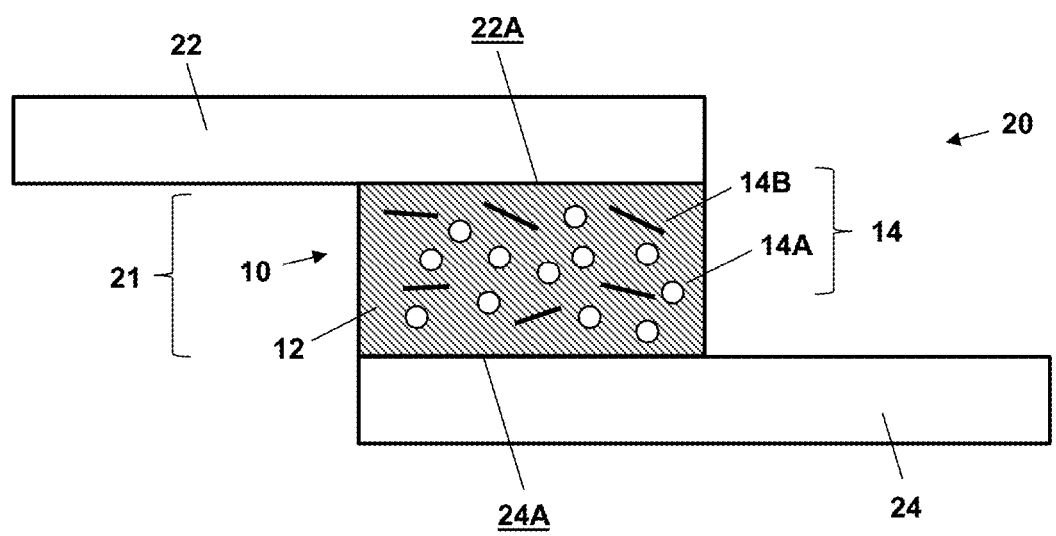
FIG. 1 is a side cross-sectional view of an assembled part incorporating an adhesive composition according to the disclosure.

While the disclosed composition, apparatus, and methods and are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

Lightweight and reliable dissimilar material joining is of special interest in automotive, aerospace, defense and marine industries.

Structural joining of materials and components involves complex phenomena and interactions between several elements of either similar or dissimilar materials. This complex behavior, coupled with the need for light-weight structures and safety (human occupants in aerospace, automotive and ground vehicles) propels the need for better understanding and efficient design. Conventional fastening techniques allow ease of assembly/re-assembly and repair but require drilling of holes and increase structural weight. Plus, the drilling of holes introduces stress concentrations that can lead to premature delamination in composites, causing reduction in load-carrying capacities. Drilling holes adds to cost and more important in fibrous materials like composites can lead to delamination causing considerable reduction in load carrying capacity. On the other hand, adhesively bonded joints are gaining popularity in place of conventional fasteners as they provide light-weight designs, reduce stress concentrations, enable joining of dissimilar materials, and are often cheaper than conventional fasteners. Bonded joints provide larger contact area than bolted joints thereby providing efficient stress distribution, enabling higher efficiency and improved fatigue life. But, commonly used bonded joints use thermoset adhesives that have a one-time cure and cannot be dis-assembled, repaired or re-assembled. Hence, there is a need for efficient and cost-effective joining techniques that inherit the advantages of both bonded joints (mainly light weight and ease of re-assembly and repair) while being cost-effective and compatible with current industrial practices. In this disclosure, an innovative joining technique that inherits the merits of bonded joints, along with the ability to dis-assemble, repair and re-assemble is provided The use of thermoplastic adhesives for bonded joints is promising for re-assembly/repair, but the energy required to heat the entire adhesive area limits the feasibility of this technique. The heat is generally applied through the adherends (joined substrates) and is infeasible in non-metallic adherends.

As indicated, joining dissimilar materials is a technical barrier to weight reduction of both civilian and military vehicles; however, other methods to produce these joints are lacking and have their own limitations. The disclosed adhesive composition provides the solution to these limitations and has potential for direct industrial acceptance with minimal to negligible change in current industrial practices.

The disclosure is directed to reversibly bonded structural joints using active adhesives that can allow for dis-assembly, repair and re-assembly. This will allow for recyclability of parts at the end of their lifetime. Currently recyclability, in-situ repair and re-assembly are desirable properties in assembled parts.

The disclosure particularly relates to adhesive composition material itself, irrespective of the type of the substrate. The substrate can either be any metal material (e.g., aluminum, steel, magnesium, etc.), any composite material (e.g., carbon fiber-reinforced polymer (CFRP), glass fiber-reinforced polymer (GRFP)), any hybrid material (e.g., multi-materials), or otherwise. Secondly, the adhesive composition can include any thermoplastic material (such as nylon, ABS, etc.) that can be modified such that it can be remotely activated for targeted heating of just the adhesive composition (e.g., and not the surrounding substrates being joined). Thermoplastics melt when exposed to temperatures beyond their melting point. Heating large surface areas of structural joints is cumbersome, time, energy and cost consuming. More importantly, if one or more of the substrates is a composite, heating at high temperatures degrades the adherends. The disclosure is directed to rapid, targeted (or localized) heating of an adhesive composition, with little or no heating of the surrounding substrate materials. While the adherends in the vicinity of the adhesive, the surrounding material of the joined surfaces will get heated (e.g., via conduction from the hot adhesive composition), but the adherends will not get degraded as they are exposed to a maximum heat (e.g., equivalent to the melting point of adhesive) for a very short period of time.

The adhesive composition includes electromagnetically excitable particles to permit rapid, localized, selective heating of the adhesive composition. Electromagnetically excitable particles (e.g., nano-scale and/or micro-scale) are incorporated or embedded in the thermoplastic (TP) matrix of the adhesive composition. The choice of the TP adhesive is dependent on the desired application. The choice of the nano-/micro-particles is dependent on the substrates used, desired application and the desired cycle times for re-assembly or repair. Examples of suitable nano-/micro-particles include ferro-magnetic nano-particles (FMNP) and graphene nanoplatelets (GNP), nano-alumina, metal-doped graphene, and metal doped nano-graphene. The nano-/micro-reinforcement is not limited to the above-mentioned particles, but can include a wide range of particulate materials including one or more electromagnetically excitable components such as carbon components and metallic components.

Depending on the nano-/micro-particles used and their concentration, different activation techniques can be used. For metallic particles in the TP adhesive, electromagnetic radiations can be used. Each of the particles acts like a tiny, localized heater, absorbing electromagnetic energy within the TP adhesive matrix and starts to heat/melt the TP adhesive surrounding it. Depending on the power, frequency, and exposure time, the TP adhesive melts and detaches/dis-assembles the two substrates. For example, joints/adherends can be separated in times ranging between 30 to 300 seconds. Similarly, for graphene-embedded TP, the GNP material absorbs microwave energy, and again each GNP acts like a tiny, localized heater nano-heater, heats up the TP adhesive rapidly, causing it to melt/flow, thereby allowing it for dis-assembly.

Further, it is possible to heat the TP adhesive matrix in an already formed, assembled part sufficiently to close any cracks, or micro-degradation. Thus, it is possible to refresh the adhesive and repair the joint seal to its original form. For example, if a joint with the TP adhesive in an assembled part has undergone several million cycles of fatigue loading due to in-service loads, then such cyclic fatigue loads can degrade the properties of the TP adhesive and resulting joints. With the adhesive compositions according to the disclosure, it is possible to refresh or perform in-situ repair of the joint without dis-assembly. This can provide considerable cost-savings, for example in the auto industry with respect to vehicle repairs of assembled part. Moreover, the simple dis-assembly of parts in itself allows for repair and replacement of only required/necessary parts rather than repair or replace the entire component, which is more expensive. In contrast, common bonding practices in the industry use thermoset materials that provide a one-time bond, which cannot be repaired or dis-assembled. Thus, for thermoset-bonded parts, the entire part needs to be changed; sub-components cannot be dis-bonded, replaced, or repaired.

Furthermore, the nano- and/or micro-particles dispersed throughout the TP adhesive matrix lead to uniform heating of the adhesive throughout the bond area. This is an important feature in the ability of the adhesive composition to form an assembled joint with large bond areas/surfaces. Furthermore, the heat generated can be mapped using IR cameras or other devices. If processing parameters are set such that it heats the entire bond surface by a very small amount and creates a low temperature rise (i.e., not affecting the properties of the adhesive, for example heating to a temperature well below a glass transition and/or a melting temperature of the TP adhesive), then an IR camera can be used to monitor the health of the joints. The dissipation of heat around cracks and defects will be different than that of the healthy joint. Thus, a combination of low-grade electromagnetic excitation/heating with thermal interrogation (e.g., via an IR camera) can be used to non-invasively monitor joint integrity and to determine when joint repair or (partial) replacement is necessary.

There exist some techniques to heat the thermoplastic adhesives. However, the targeted heating of the adhesive using various individual or combinations of nano-/microparticulate fillers in the adhesive composition along with various electromagnetic excitations (e.g., electromagnetic induction, microwave, or any other interaction, depending on the nano-/micro-filler) provides a unique approach. Further, the technique is independent of both the adherend/substrate and the TP adhesive material. Further, the tailored or reinforced adhesive can be provided in the form of a film, or it can be used in various dispensing techniques common in automotive industry. Remote electromagnetic activation/heating of the adhesive composition can be used for bonding/joining/assembly, dis-assembly and repair.

The disclosed adhesive composition provides the ability to perform in-situ repair, e.g., heating the TP adhesive just enough to close any cracks, or micro-degradation, thus refreshing the adhesive to a state as if it were in a new, freshly assembled part.

FIGS. 1-5 below generally illustrate an adhesive composition 10 as well as a corresponding part 20 incorporating the adhesive composition 10, for example as a standalone part 20 or in various methods for assembling, disassembling, and/or repairing the part 20. The adhesive composition 10 includes a thermoplastic polymer (e.g., thermoplastic polymer adhesive) matrix 12 throughout which electromagnetically excitable particles (EEPs) 14 are distributed (e.g., homogeneously or substantially homogeneously distributed). The EEPs 14 can be nanoparticles and/or microparticles, and the adhesive composition 10 can include more than one type of EEP (e.g., one type, two or more types, for example two, three, or four different types of EEPs), where different types can be based on different materials, shapes, and/or (average) sizes, etc. of the EEPs. For example, as illustrated, the adhesive composition 10 can include a first type of EEP 14A (e.g., illustrated as having a particulate and/or semi-spherical particulate shape) and a second type of EEP 14B (e.g., illustrated as having a plate, fiber, or rod-like particulate shape), both distributed throughout the matrix 12. As described in more detail below, the EEPs 14 are formed from suitable materials so that they can permit targeted, remote heating of the thermoplastic polymer matrix 12 using non-contact electromagnetic methods such as eddy current induction heating and/or microwave heating by directed corresponding electromagnetic radiation into the adhesive composition 10 where the EEPs 14 absorb the radiation and convert it to thermal energy. In addition to providing a means for non-contact heating, the EEPs 14 also can serve as a composite reinforcement (e.g., depending on shape, size, and material of the EEPs 14) for the matrix 12 to improve the mechanical properties of the adhesive composition 10, in particular as incorporated into an assembled part 20.

The specific thermoplastic polymer (or combination of polymer in admixture) used for the matrix 12 is not particularly limited and can include any thermoplastic polymer adhesive materials known in the art. The thermoplastic polymer is generally in a solid state at normal usage temperatures of the final part 20 into which it will be incorporated. For example, the glass transition temperature and/or the melting temperature of the thermoplastic polymer is such that the thermoplastic polymer is in a solid state at a temperature ranging from 10° C. or 20° C. to 30° C., 40° C., or 50° C. (e.g., or lower; such as at about 10° C., 20° C., 25° C., 30° C., 40° C., or 50° C. or lower). For example, the glass transition temperature and/or the melting temperature of the thermoplastic polymer can be at least 50° C., 100° C., 150° C., 200° C., or 250° C. and/or up to 100° C., 150° C., 200° C., 300° C. or 400° C. independently. Examples of suitable thermoplastic polymers include polyamides (nylons; such as polyamide-/nylon-6 or 66), polyesters, polyurethanes (e.g., including polyester and/or polyether soft segments), acrylonitrile-butadiene-styrene (ABS) copolymers, styrene block copolymers (e.g., styrene-butadiene-styrene (SBS), styrene-isoprene-styrene (SIS), styrene-ethylene/butylene-styrene (SEBS), styrene-ethylene/propylene (SEP)), polycarbonates, polyolefins (e.g., polyethylene (low-density LDPE, high-density HDPE), polypropylene), ethylene-vinyl acetate copolymers, and/or ethylene-acrylate copolymers, for instance as single polymers or in admixture.

The thermoplastic polymer is generally present as a substantial portion of the matrix 12. For example, the thermoplastic polymer forming the matrix 12 can be present in the adhesive composition 10 in an amount ranging from 50 wt. % to 99.9 wt. %. More generally, the thermoplastic polymer forming the matrix 12 can be present in the adhesive composition 10 in an amount of at least 50 wt. %, 60 wt. %, 70 wt. %, 80 wt. %, 90 wt. %, 95 wt. %, or 98 wt. % and/or up to 80 wt. %, 90 wt. %, 95 wt. %, 98 wt. %, 99 wt. %, 99.5 wt. %, or 99.9 wt. %.

As described above, the EEPs 14 are able to absorb electromagnetic radiation and convert it to thermal energy, thus permitting targeted, remote heating of the thermoplastic polymer matrix 12 using non-contact electromagnetic methods such as eddy current induction heating and/or microwave heating by directed corresponding electromagnetic radiation into the adhesive composition 10. A variety of conventional materials are suitable for their ability to absorb and convert electromagnetic radiation, and such materials can include carbon-containing materials (e.g., partially, completely, or substantially completely formed from carbon) and metal-containing material (e.g., partially, completely, or substantially completely formed from metals, metal alloys, metallic compounds such as metal oxides). Examples of suitable metals include iron (e.g., in the form of oxides such as $Fe_2O_3$ and/or $Fe_3O_4$) and aluminum (e.g., in the form of oxides such as $Al_2O_3$). Carbon-containing materials are particularly suited for absorption of microwave radiation for conversion to thermal energy within the carbon-containing material. Metal-containing materials are particularly suited for absorption of electromagnetic radiation from a variable magnetic field, which in turn generates electromagnetic induction heating within the metal-containing material. Examples of suitable EEPs 14 included ferromagnetic nanoparticles, graphene nanoplatelets, alumina nanoparticles, metal-doped graphene microparticles, and/or metal-doped graphene nanoparticles (e.g., alone or in admixture). Particular examples of carbon-containing EEPs 14 include graphite particles, exfoliated graphite nanoplatelets, carbon nanotubes, carbon fibers, and/or carbon black (e.g., alone or in admixture).

In some cases, the EEPs 14 can include at least one carbon-containing material and at least one metal-containing material (e.g., carbon and metal materials incorporated into the same EEPs 14; one type of EEP 14A including a carbon material and a second type of EEP 14B including a metal material). The combination of materials can provide a synergy of improved mechanical reinforcement properties (e.g., when using two types of EEPs 14 with different shapes/sizes/materials as mechanical reinforcements) and/or improved processing properties such as the ability to remotely heat the adhesive composition 10 via electromagnetic induction heating and/or microwave heating (e.g., where at least one of the carbon and metal materials can absorb and convert the incoming radiation, regardless of whether the two materials are combined in a single type or different types of EEPs 14).

The EEPs 14 can be nanoparticles and/or microparticles. For example, nanoparticle EEPs 14 can have a size ranging from 1 nm to 1000 nm, such as at least 1 nm, 2 nm, 5 nm, 10 nm, 20 nm, 50 nm, or 100 nm and/or up to 10 nm, 20 nm, 50 nm, 100 nm, 200 nm, 500 nm, or 1000 nm. The nanoparticle sizes can represent a diameter or equivalent diameter of a granular, spherical, or semi-spherical nanoparticle, a thickness of a platelet-shaped nanoparticle, or a length or diameter of a rod-shaped nanoparticle. Similarly, microparticle EEPs 14 can have a size ranging from 1 μm to 100 μm, such as at least 1 μm, 2 μm, 5 μm, 10 μm, or 20 μm and/or up to 10 μm, 20 μm, 50 μm, or 100 μm. The microparticle sizes can represent a diameter or equivalent diameter of a granular, spherical, or semi-spherical microparticle, a diameter of a platelet-shaped microparticle, or a length or diameter of a rod-shaped microparticle. For either nanoparticles or microparticles, the foregoing ranges can represent a size range for a particle size distribution, or a range for an average (weight-, number-, or volume-average) size for a particle size distribution. Some EEPs 14 can have nano- and micro-particle characteristics dimensions. For example, platelet-shaped EEPs 14 (e.g., exfoliated graphite nanoplatelets) can have a micrometer-scale diameter or equivalent diameter and a nanometer-scale thickness.

The EEPs 14 can be present in any desired amount in the adhesive composition 10, taking into consideration a loading level that is sufficient to absorb electromagnetic radiation and heat the surrounding thermoplastic polymer matrix 12 to a desired temperature. Generally, a higher loading of EEPs 14 corresponds to higher heat transfer rates and/or higher peak temperatures given a particular level of excitation energy for the incident electromagnetic radiation. A desirable achievable peak temperature in the matrix 12 can be selected based on the thermoplastic polymer(s) forming the matrix such that the peak temperature is high enough (e.g., above the glass transition and/or melting temperature of the thermoplastic polymer) to make the thermoplastic polymer flowable, whether on its own or under an applied pressure or force. Similarly, the peak temperature in the matrix 12 during normal use should be less than any thermal degradation temperature of the thermoplastic polymer. Further, the amount of EEPs 14 can be selected in view of any desirable mechanical properties imparted by the EEPs 14 to the matrix 12 as type of composite reinforcement. Suitably, the EEPs 14 are present in the adhesive composition 10 in an amount ranging from 0.1 wt. % to 20 wt. %, for example at least 0.1 wt. %, 0.5 wt. %, 1 wt. %, 2 wt. %, 3 wt. %, 5 wt. %, 6 wt. %, 8 wt. %, or 10 wt. % and/or up to 2 wt. %, 4 wt. %, 6 wt. %, 8 wt. %, 10 wt. %, 12 wt. %, 15 wt. %, or 20 wt. %. For example, the EEPs 14 can be present in amounts from 2 wt. % to 20 wt. %, 5 wt. % to 15 wt. %, 6 wt. % to 12 wt. %, or 8 wt. % to 10 wt. % relative to the adhesive composition 10, such as in amounts providing synergistic benefits of rapid and/or sufficiently high-temperature heating combined with advantageous mechanical properties for the composite adhesive composition 10. The foregoing amounts and ranges can apply independently either to all EEPs 14 present in the matrix 12 or the individual types of EEPs 14 present in the matrix 12 (e.g., when there are two or more different kinds of EEPs 14 present in the matrix 12).

In some embodiments, the EEPs 14 can include a chemical functionalization moiety for compatibilization with the thermoplastic polymer of the matrix 12 to promote mixing, homogeneous distribution, and/or adhesion between the two composite phases. Enhancements in mechanical, thermal, and/or damage-resistance properties offered by addition of the EEPs 14 in the thermoplastic polymer of the matrix 12 can be further enhanced by chemical functionalization (e.g., creating chemical compatibility between the matrix polymer (s) and EEPs 14). For example, the EEPs 14 can include a surface compatibilizing agent which is covalently bonded or otherwise bound (e.g., as an adsorbed or absorbed coating) to the surface of the EEPs 14 and which contains the same, similar, or otherwise chemically compatible functional groups relative to the thermoplastic polymer matrix in the adhesive composition. For example, compatibilizing functional groups can include amide, amine, hydroxy, ester, ether, ketone, urethane, aliphatic hydrocarbon, aromatic hydrocarbon, etc. Examples of specific compatibilizing functional groups include aliphatic epoxy (AE), phase-separated carboxyl-terminated acrylonitrile butadiene rubber (CTBN), and styrene-butadiene-methyl-methacrylate (SBM) triblock, which can be useful with carbon-based EEPs 14 (e.g., graphene nanoplatelets or otherwise) and/or metal-based EEPs 14 (e.g., iron-based material such as ferromagnetic nanoparticles or otherwise).

In some embodiments, the adhesive composition 10 can further include one or more additives common for thermoplastic adhesives. For example, the composition 10 can include one or more of tackifying resins, waxes, plasticizers, antioxidants, ultraviolet stabilizers, colorants, biocides, flame retardants, antistatic agents, and fillers (e.g., calcium carbonate, clays or nanoclays, talc, silica, etc.). Such additives can be included in amounts ranging from 0.5 wt. % to 40 wt. % (e.g., at least 0.5 wt. %, 1 wt. %, 2 wt. %, 5 wt. %, or 10 wt. % and/or up to 5 wt. %, 10 wt. %, 20 wt. %, 30 wt. %, or 40 wt. %), where such amount ranges can apply independently to all additives combined or to different types of additive individually.

In addition to illustrating the adhesive composition 10 in its various embodiments as described above, FIG. 1 further illustrates an assembled part 20 incorporating the adhesive composition 10 in a finished product. The adhesive composition 10 can be used to fixedly but removably join (i.e., with application of electromagnetic radiation-induced heating) to substrates 22 and 24 at a joint interface 21. As illustrated in FIG. 1, a first surface 22A (e.g., of the first substrate 22 or otherwise) and a second surface 24A (e.g., of the second substrate 24 or otherwise) are both bonded to the adhesive composition 10 at the joint interface 21 while the composition 10 is in a solid state. Although illustrated as two separate structures, the first and second surfaces 22A, 24A can be portions of the same or different/separate substrates. For example, as particularly illustrated in FIG. 1, the first surface 22A is a surface of the first substrate 22 and the second surface 24A is a surface of the second substrate 24 which is separate or otherwise discontinuous from the first substrate 22 (e.g., two separate substrate pieces to be joined in the assembled part 20). In another embodiment, the first and second surface 22A, 24A are surfaces of a single substrate (e.g., two separate surfaces of a single substrate piece that curve or otherwise wrap around to be joined together).

The materials forming the surfaces 22A, 24A and/or substrates 22, 24 are not particularly limited and generally can include any desired material to which the adhesive composition 10 will adhere or bond upon cooling or solidifying to a solid state. In some embodiments, the surfaces 22A, 24A and/or substrates 22, 24 are formed from the same materials. In some embodiments, the surfaces 22A, 24A and/or substrates 22, 24 are formed from different materials. Examples of suitable materials for the surfaces 22A, 24A and/or substrates 22, 24 include a metal material (e.g., steel, aluminum, magnesium), a polymeric material (e.g., composite material such as a glass or other fiber-reinforced polymer, glass-mat thermoplastic composite, sheet-molding compound composite), and a non-metallic material. In a particular embodiment where the surfaces 22A, 24A and/or substrates 22, 24 are formed from different materials, one is formed from a metal material and the other is formed from a polymeric material or other non-metallic material.

Figure 2:
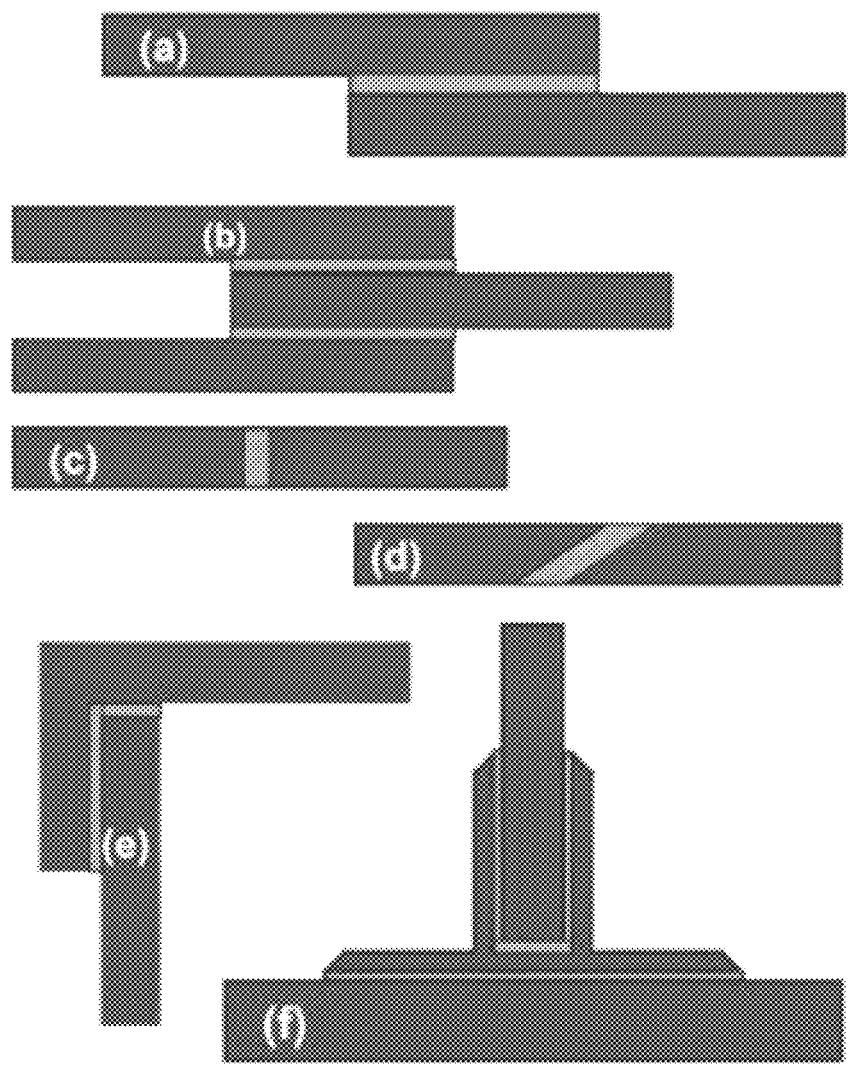
FIG. 2 includes side cross-sectional views of an assembled part incorporating an adhesive composition according to the disclosure and in various joint interface configurations: (a) lap joint, (b) double lap joint, (c) butt joint, (d) scarf joint, (e) corner/L-joint, and (f) Pi-/T-joint.

FIG. 1 illustrates an assembled part 20 using the adhesive composition 10 in particular for an in-plane or lap joint, but the adhesive composition 10 can be used to form a bond and seal at any type of structural joint interface 21. Moreover, any combinations/types of substrates/adherends can be used. As illustrated in FIG. 2, suitable joint interfaces 21 can include (a) a lap joint, (b) a double-lap joint, (c) a butt joint, (d) a scarf joint, (e) a corner/L-joint, and (f) a T-/Pi-joint.

The distance between the first and second surfaces 22A, 24A in the assembled part is not particularly limited. In some embodiments, the distance can be at least 10 µm, 20 µm, 50 µm, 100 µm, or 200 µm and/or up to 100 µm, 200 µm, 500 µm, or 1000 µm. Alternatively or additionally, the distance between the first and second surfaces 22A, 24A can be selected to be a constant separation distance. One manner of forming the part 20 with the constant separation distance is to place one or more spacers between the first surface 22A (or first substrate 22) and the second surface 24A (or second substrate 24) (not shown) when the part 20 is being assembled and engaging or compression forces are being applied to the two opposing surfaces 22A, 24A, which spacers have a thickness corresponding to the desired constant separation distance.

Figure 3:
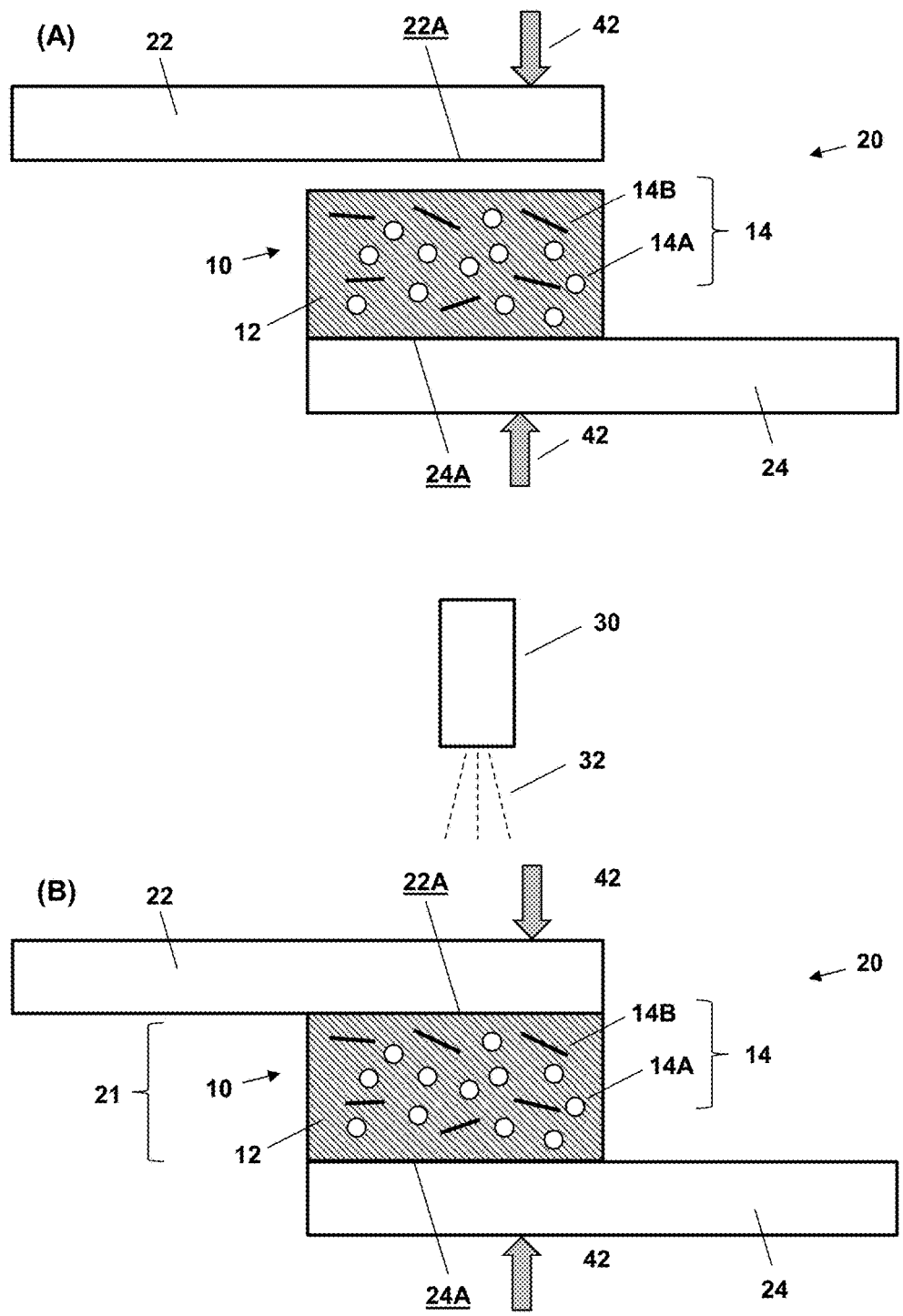
FIG. 3 illustrates a method for assembling a part incorporating an adhesive composition according to the disclosure.

FIG. 3 illustrates a method of assembling the part 20 using the adhesive composition 10 according to the disclosure. As shown in panel (A), the adhesive composition 10 is contacted with the first surface 22A and the second surface 24A at the location of the eventual joint interface 21 of the part 20 to be assembled, for example with the application of an engaging force or pressure 42 at one or both of the surfaces 22A, 24A (or corresponding substrates 22, 24). As shown in panel (B), electromagnetic radiation 32 from an electromagnetic radiation source 30 (e.g., microwave, electromagnet) is directed to the adhesive composition 10 to heat the composition 10 and to transform the composition 10 to flowable or moldable state. For example, the radiation 32 is applied for a time sufficient and/or at an intensity sufficient to indirectly heat the EEPs 14, thereby raising the temperature of the thermoplastic polymer in the matrix 12 sufficiently high to transform the thermoplastic polymer to a flowable or moldable state, such as heating to a temperature at or above the glass transition temperature or the melting temperature of the thermoplastic polymer. As illustrated, the engaging force or pressure 42 can be applied to one or both of the surfaces 22A, 24A when heating the adhesive composition 10, thereby causing the thermoplastic polymer to expand radially/laterally outwardly and contact an increased surface area at the joint interface 21 (e.g., an increased area relative to the adhesive composition 10 prior to heating via the electromagnetic radiation 32). The degree of heating of the adhesive composition 10 is suitably limited or controlled (e.g., via radiation time and/or intensity, EEP 14 loading amount) to a degree sufficient avoid or prevent heat-induced damage to one or both of the surfaces 22A, 24A (or corresponding substrates 22, 24). For example, the peak or maximum temperature of the adhesive composition 10 is controlled to be below a damage threshold temperature for the surfaces 22A, 24A. In some cases, the electromagnetic radiation heating can be cycled between high and low intensities or application times to avoid damage. After sufficient heating and contact time while the composition 10 is in the flowable or moldable state, application of the electromagnetic radiation 32 is halted and the adhesive composition 10 is cooled (e.g., passive cooling/heat dissipation to the environment; active/forced cooling), thereby transforming the adhesive composition 10 to a solid state in contact with and bonded to the surfaces 22A, 24A surface at the joint interface 21 and creating the assembled part 20.

The specific type of electromagnetic radiation 32 is not particularly limited, but it is generally selected to be complementary to the EEP 14 materials such that it is a type of radiation that is absorbed as converted to thermal energy within the EEPs 14 for subsequent heat transfer to the thermoplastic polymer matrix 12. In an embodiment, for example, the EEPs 14 include a carbon material and the electromagnetic radiation 32 includes microwave radiation. In another embodiment, the EEPs 14 include a metallic material, and the electromagnetic radiation 32 includes a variable magnetic field generating electromagnetic induction heating within the EEPs 14. In another embodiment, the EEPs 14 include at least one a carbon material and at least one metallic material and the electromagnetic radiation includes at least one of microwave radiation and a variable magnetic field generating electromagnetic induction (e.g., two different types of particles are present to allow two different types of remote heating, where either or both methods can be used as desired and as appropriate for the surrounding substrate materials, such as when one substrate is metallic).

Figure 4:
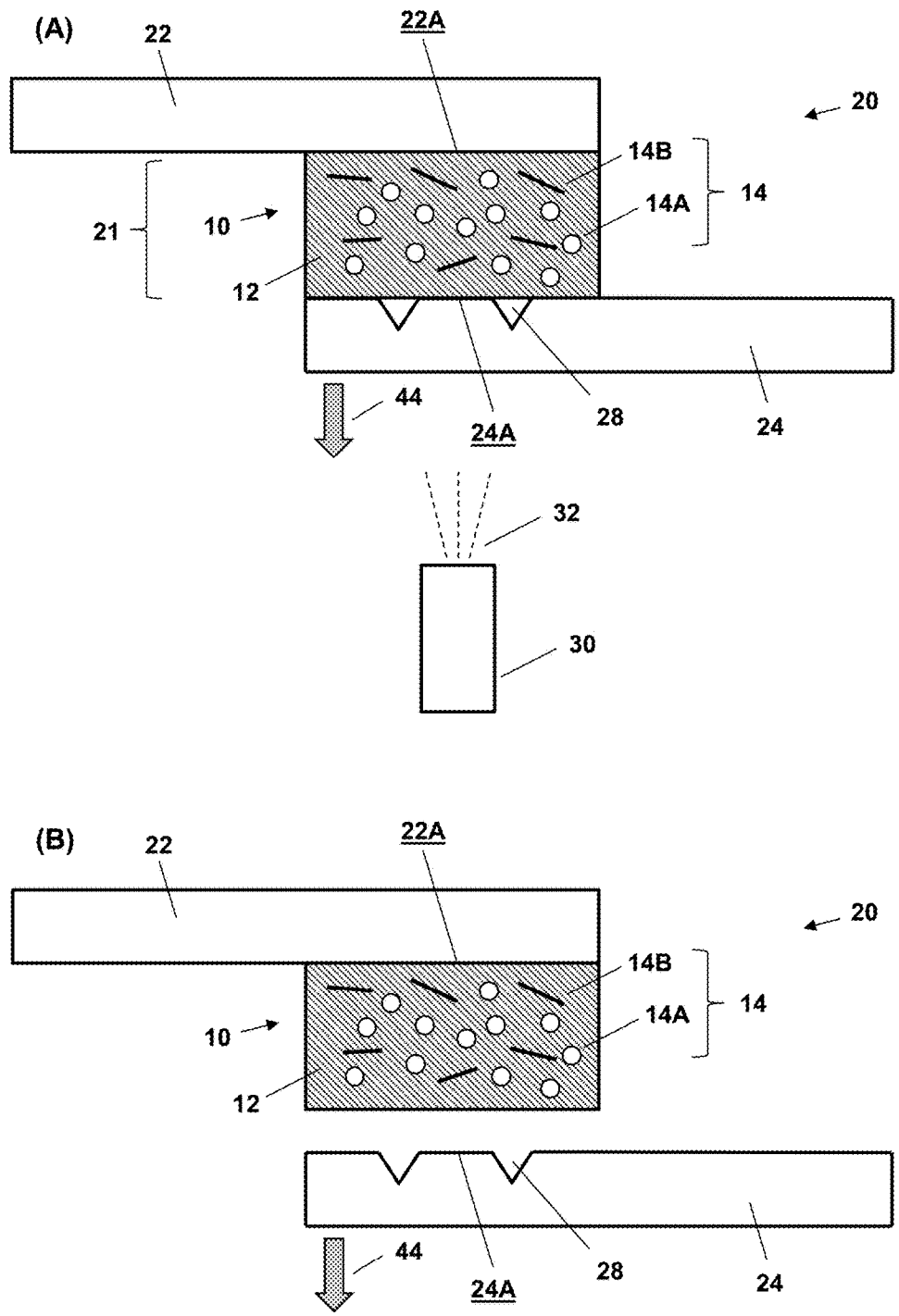
FIG. 4 illustrates a method for disassembling a part incorporating an adhesive composition according to the disclosure.
Figure 4:
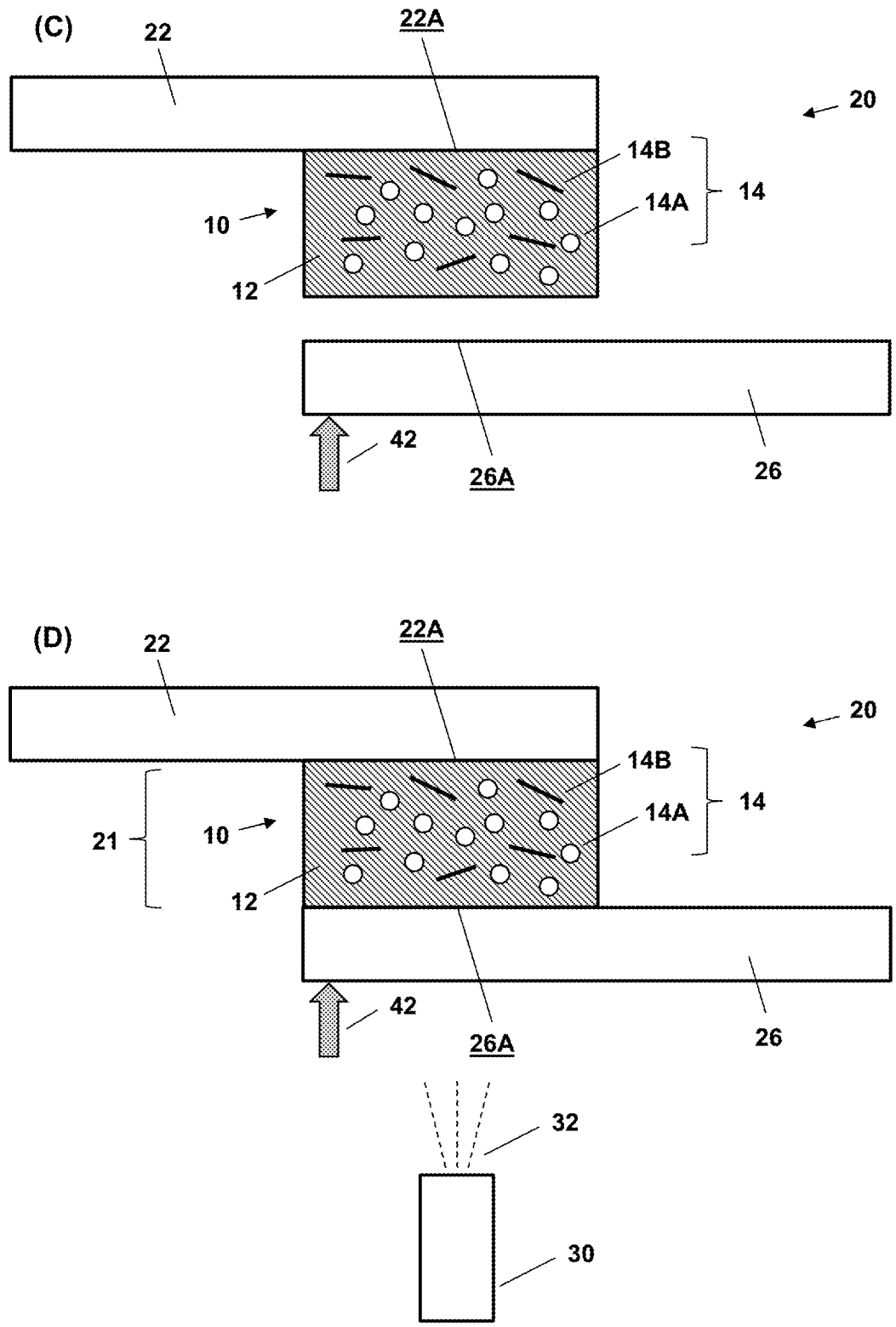

FIG. 4 illustrates a method of disassembling the part 20 using the adhesive composition 10 according to the disclosure. As shown in panel (A), the assembled part 20 is provided in an initial state with the adhesive composition 10 in a solid state and in contact with and bonded to the first surface 22A and the second surface 24A at the joint interface 21 of the assembled part 20. As further shown in panel (A), electromagnetic radiation 32 is directed to the adhesive composition 10 to heat the composition and to transform it to a flowable or moldable state (e.g., thereby de-bonding the adhesive composition 10 with one or both of the first and second surfaces 22A, 24A). As shown in panel (B), the first surface 22A and the second surface 24A can be separated from each other, for example with application of a disengaging or pulling force 44 on at least one of the surface 22A, 24A (or substrates 22, 24) such that surfaces 22A, 24A are no longer in contact with each other via the composition 10 (e.g., one or both of the surfaces 22A, 24A can be in contact with a portion of the composition 10, but the composition 10 does not provide a continuous bond between the two surfaces 22A, 24A. The two surfaces 22A, 24A (or substrates 22, 24) are disengaged, for example without causing any damage or substantial damage to the two surfaces 22A, 24A (or substrates 22, 24).

Disassembly of the part 20 can be performed, for example, to repair or provide maintenance to the one or more of the part components. As illustrated, for instance, the second surface 24A/substrate 24 can include a defect 28 (e.g., a void area/volume such as crack, crevice, hole, breakage, or other microdegradation structure) resulting from continuous use/cycle fatigue of the part 20 over time or from a single damaging event (e.g., a one-time impact, stress, or strain). For example, in some cases, after disassembly, the foregoing assembly method can be performed to re-bond the first surface 22A and the second surface 24A at the joint interface 21, such as after performing some maintenance or repair on a component of the part 20 itself (e.g., to repair the defect 28) or another part accessible after disassembly of the joined part 20. As another example as shown in panels (C) and (D) of FIG. 3, a third surface 26A (or third substrate 26) can be provided as a replacement part, such as for the second surface 24A (or second substrate 24). Then, the foregoing assembly method can be performed to bond the first surface 22A and the third surface 26A at the joint interface 21, such as to assemble the part 20 after disassembly with the replacement part. Similarly, a replacement part for the first surface 22A also could be used and replaced (e.g., a fourth surface or substrate, not shown). Suitably, the third surface 26A (or corresponding third substrate 26) has the same shape and/or is formed from the same material as the second surface 24A (or second substrate 24), such as where the third surface 26A is a replacement part for the second surface 24A in its original form when originally assembled and without damage or wear. In some embodiments, additional, supplemental, or replacement adhesive composition 10 can be used to re-bond the first surface 22A and second or third surface 24A, 26A, for example when some or all of the adhesive composition 10 in the original assembled part 20 is lost when disassembling the part 20 (e.g., when some adhesive composition 10 remains on the second surface 24A that is replaced by the third surface 26A).

Figure 5:
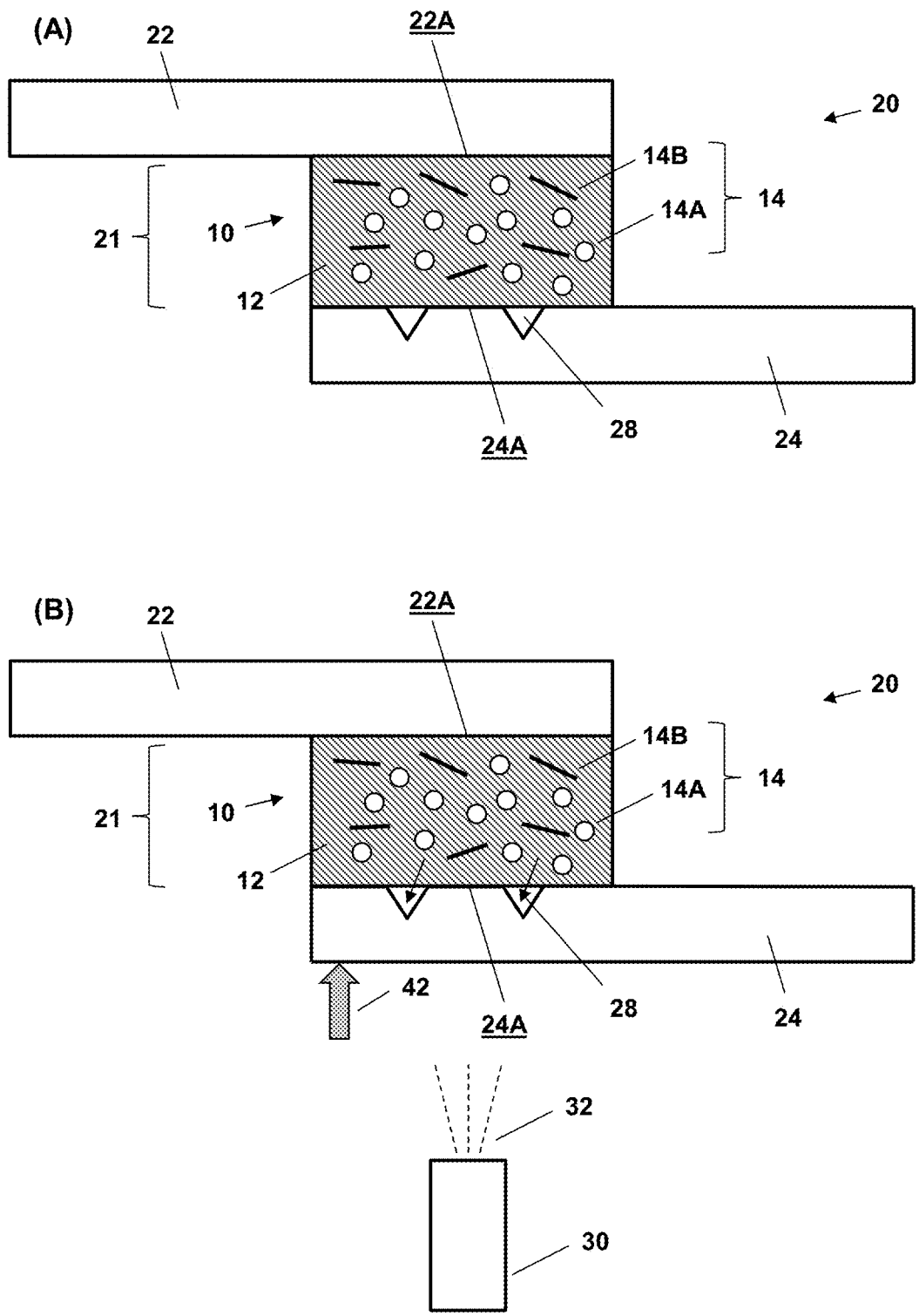
FIG. 5 illustrates a method for repairing a part incorporating an adhesive composition according to the disclosure.
Figure 5:
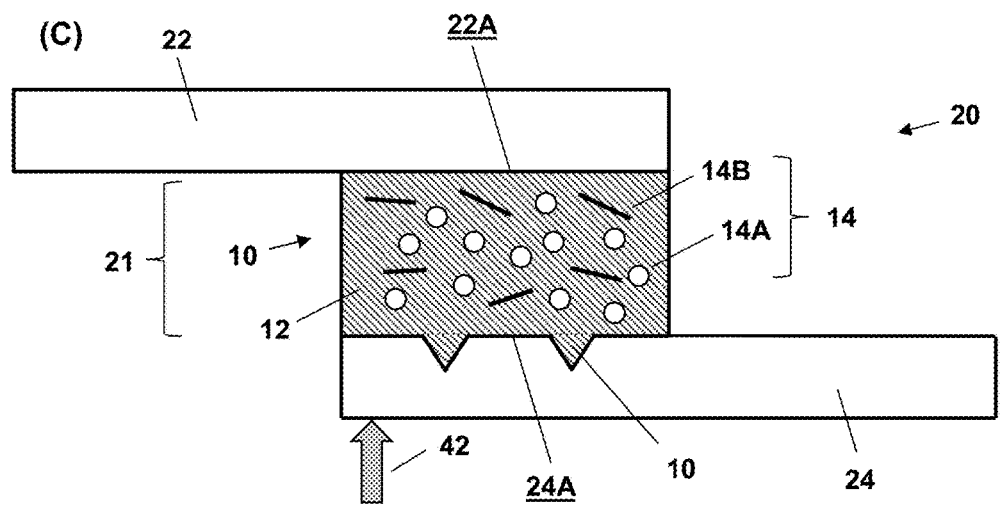

FIG. 5 illustrates a method of repairing an assembled (but damaged) part 20 using the adhesive composition 10 according to the disclosure. As shown in panel (A), the assembled part 20 includes the adhesive composition 10 in a solid state and in contact with and bonded to the surfaces 22A, 24A at the joint interface 21 including a defect 28, for example resulting from continuous use/cycle fatigue of the part 20 over time or from a single damaging event (e.g., a one-time impact, stress, or strain). One or more defects 28 (e.g., a void area/volume such as crack, crevice, hole, breakage, or other microdegradation structure) can be present in the first surface 22A/substrate 22, the second surface 24A/substrate 24, and/or the adhesive composition 10 (e.g., a void etc. in the matrix 12). As illustrated in FIG. 5 by way of example, the second surface 24A/substrate 24 includes the defect 28. As shown in panel (B), electromagnetic radiation 32 is directed to the adhesive composition 10 to heat the composition and to transform it to a flowable or moldable state. Once the thermoplastic polymer of the matrix 12 has been sufficiently heated, the adhesive composition 10 (e.g., thermoplastic polymer component thereof) can flow into the defects 28, thereby at least partially filling voids, cracks, etc. to repair part 20 structures at the joint interface 21. While in some cases the heated adhesive composition 10 can be flowable under gravity into the defects 28, in other cases it is desirable to apply pressure or other compression/engaging force 42 to one or both of the surfaces 22A, 24A (or substrate 22, 24) when heating the adhesive composition 10, thereby causing the thermoplastic polymer to expand, contact an increased surface area at the joint interface 21, and flow into the defect 28 void areas (e.g., at least partially, substantially completely, or completely filling the defect 28 void areas). Once the damaged part 20 has undergone heating and any desired compression for a sufficient period for repair (e.g., to result in a desired level of defect 28 void filling), application of the electromagnetic radiation 32 is halted and the adhesive composition 10 is cooled (e.g., passive cooling/heat dissipation to the environment; active/forced cooling), thereby transforming the composition 10 back to a solid state in contact with and bonded to the surfaces 22A, 24A as well as the defect 28 void areas or volumes at the joint interface 21 (e.g., at least partially, substantially completely, or completely bonded to the defect 28 void surfaces). A part 20 with a joint interface 21 repaired in this manner can recover a substantial amount of their original strength, for example having a tensile (shear) strength of at least 80%, 85%, 90%, 95%, or 98% and/or up to 90%, 95%, 98%, 99% or 100% relative to that of a corresponding pristine part 20 as originally formed (e.g., with new substrates 22, 24 and new adhesive composition 10), for example where the part 20/joint interface 21 prior to repair has a (damaged) tensile (shear) strength of at least 20%, 30%, 40%, 50%, or 60% and/or up to 30%, 50%, 60%, 70% or 80% relative to that of the corresponding pristine part 20 as originally formed.

EXAMPLES

Example 1

Joining of materials and components is inevitable as it allows versatility in assembly and repair along with reduction in time and cost of manufacturing. However, joints are mostly considered the 'weak-links' of the structure due the complex phenomena and interactions of several elements of either similar or dissimilar materials. These complexities combined with the need for lightweight structures and increased safety requires better understanding and development of robust dissimilar material joints. This example illustrates the use of the disclosed active adhesives, which inherit all the advantages of bonded joints (e.g., being lightweight, elimination of holes and associated stress-concentrations), while overcoming the shortcomings of bonded joints related to disassembly and repair. Additionally, manufacturing flaws and in-service damage such as impact-induced delamination can be repaired through strategic heating of the adhesive without affecting the adherends.

Thermoplastic adhesives modified by the incorporation of electrically conductive graphene nanoplatelets (GNP) at a concentration above the percolation point provide a unique synergy of mechanical, thermal and electrical properties. While the choice of the thermoplastic is governed by the desired application the addition of the graphene nanoplatelets allows energy to be deposited primarily in the adhesive. The percolated network of graphene particles in the adhesive at less than 2% can quickly couple to high frequency radiation (microwave, or μW) via non-contact methods and increase the adhesive temperature to above the required processing temperatures. The adhesive melts and flows over the adherends and upon cooling forms a structural adhesive bond. Furthermore, the process can be used to disassemble the adhesive joint if repair or reworking is required. Such active adhesive compositions with repeatable healing/repair and facile disassembly can be used in structural joining, and in a wide range of applications. The developed joints can be easily adopted in current industry practices wherein bonded techniques are commonly used with added advantage of re-assembly and repair.

The illustrated adhesive composition overcomes the limitations of conventional joining techniques and incorporates the advantages of both bonded (lightweight) and bolted (easy disassembly) techniques. Further, defects such as manufacturing flaws and in-service damage can be repaired/healed through the disclosed active adhesives. Thermoplastic adhesives modified by the incorporation of electrically conductive graphene nanoplatelets at a concentration above the percolation point provide a unique synergy of mechanical, thermal and electrical properties. While the choice of the thermoplastic is governed by the desired application the addition of the graphene nanoplatelets allows energy to be deposited primarily in the adhesive. The percolated network of graphene particles in the adhesive at less than 2% can quickly couple to ultra-high frequency (UHF) microwave (MW) radiation via non-contact methods and increase the adhesive temperature to above the required processing temperatures. The adhesive melts and flows over the adherends and upon cooling forms a structural adhesive bond. Furthermore, the process can be used to disassemble the adhesive joint if repair or re-working is required.

This example illustrates the application of the disclosed active adhesives for structural joining of dissimilar materials, with the ability to dis-assemble/re-assemble and in-service repair. The multi-material joining includes but is not limited to: composites-to-metals, composites-to-composites and metals-to-composites. Suitable composite materials can include thermoplastic or thermoset matrices with any desired reinforcement, such as with glass, carbon, or other fibers. Suitable metal adherends can include steel (e.g., Advanced High Strength Steel-AHSS, High strength low alloy steel-HSLA, etc.) and aluminum (e.g., 5 k, 6 k series). The selection of adherends for both composites and metals is governed by the end-use product needs (e.g., as an automotive component or otherwise) in terms of mechanical properties, corrosion inhibition, cost, and ease of transition/acceptance in current industry practice.

The disclosed active adhesive composition inherits the benefits of bonded joints, mainly reduced structural weight, while overcoming limitations of re-assembly and in-service repair. Thermoplastic adhesives modified by the incorporation of electrically conductive graphene nano platelets at a concentration above the percolation point provide a unique synergy of mechanical, thermal and electrical properties. While the choice of the thermoplastic is governed by the desired application, the addition of the graphene nano platelets allows energy to be deposited primarily in the adhesive. The percolated network of graphene particles in the adhesive at less than 2% can quickly couple to ultra-high frequency (UHF) microwave (MW) radiation (microwave, MW) via non-contact methods and increase the adhesive temperature to above the required processing temperatures. The adhesive melts and flows over the adherends and upon cooling forms a structural adhesive bond. Furthermore, the process can be used to disassemble the adhesive joint if repair or reworking is required. A schematic of the disclosed active adhesive composition is provided in FIG. 1 and described in more detail above both in terms of the adhesive composition 10 itself and in the context of an assembled part 20. The disclosed active adhesives with repeatable healing/repair and facile disassembly are useful in structural joining, and can be applied in a wide range of applications, for example in (a) in-plane (lap-joints), (b) out-of-plane (3D-woven Pi/T-joints), and (c) torsional/rotatory (super-charger) joints.

Figure 6:
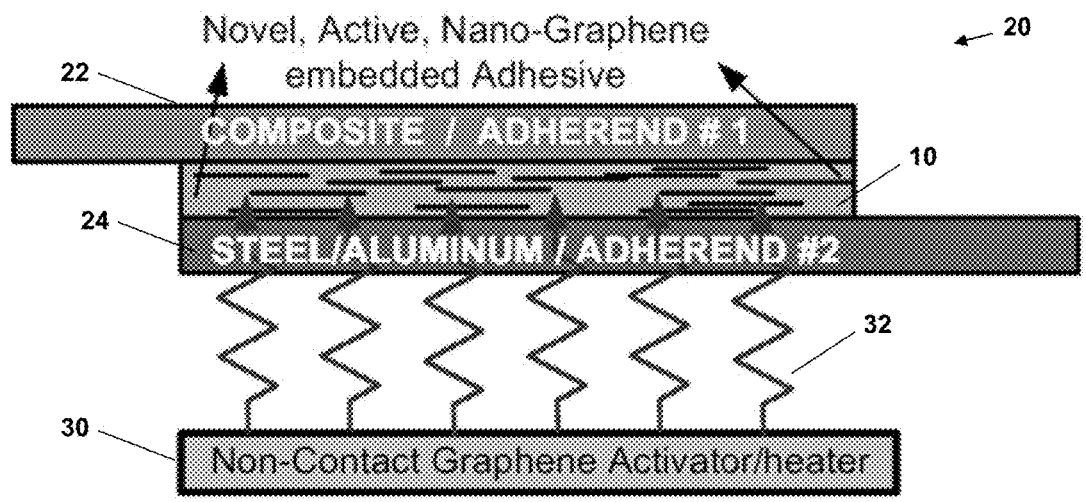
FIG. 6 is a side cross-sectional view of an assembled in-plane lap-joint part incorporating an adhesive composition according to the disclosure and including metallic and composite adherends.
Figure 7:
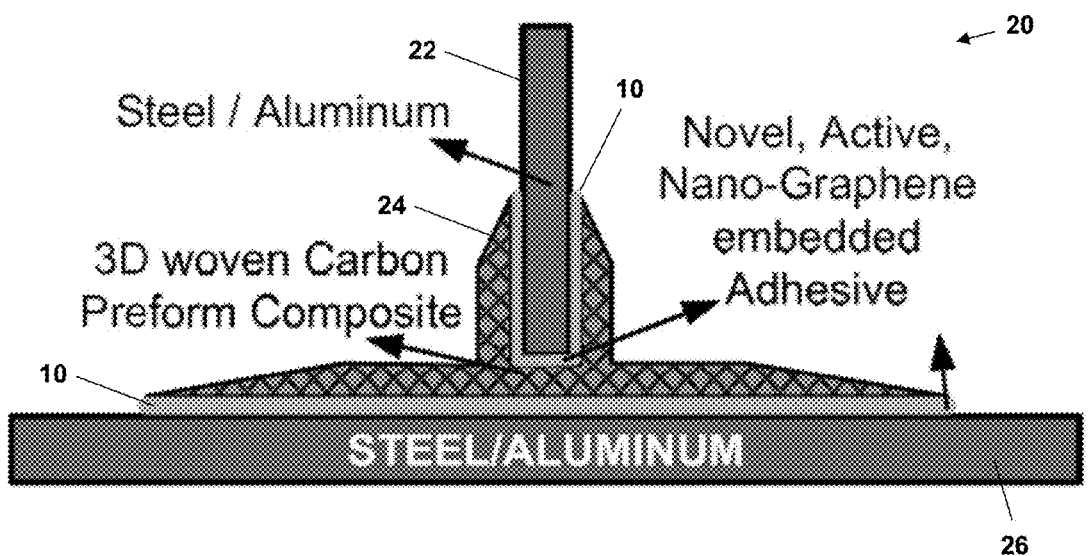
FIG. 7 is a side cross-sectional view of an assembled out-of-plane T-joint part incorporating an adhesive composition according to the disclosure and including metallic and composite adherends.

The disclosed adhesive composition uses thermoplastic adhesives modified by the incorporation of electrical conductive graphene nanoplatelets at a concentration above the percolation point providing a unique synergy of mechanical, thermal and electrical properties. While the choice of the thermoplastic is governed by the desired application the addition of the graphene nanoplatelets allows energy to be deposited primarily in the adhesive, with minimal effect on the adherends. The percolated network of graphene particles in the adhesive at less than 2% can quickly couple to ultra-high frequency (UHF) microwave (MW) radiation via non-contact methods and increase the adhesive temperature to above the required processing temperatures. The adhesive melts and flows over the adherends and upon cooling forms a structural adhesive bond. Furthermore, the process can be used to disassemble the adhesive joint if repair or reworking is required. Schematics of assembled parts 20 incorporating the adhesive composition 10 are provided in FIG. 6 (in-plane or lap joint) and FIG. 7 (out-of-plane or Pi/T-joint).

This example illustrates that 2.45 GHz electromagnetically excitable XGNP/TP composite adhesives could produce an acceptable lap shear strength for bonding two composite adherends (glass fiber-reinforced epoxy plates). The thermoplastic polymer (TP) used as the adhesive matrix was an extrusion-grade polyamide-6 (or nylon-6) curable by physical hardening, having a density of 1.14 g/cc, a vicat softening temperature of 200° C., an application temperature ranging from 220° C. to 260° C., and a linear coefficient of thermal expansion (CTE) of 80 µm/m-° C. The electromagnetically excitable particles used for the adhesive composition were exfoliated graphene nanoplatelets (XGNP) having a diameter of about 5 µm and a thickness of about 10 nm to 20 nm. Prior to the melt extrusion process, the nylon-6 pellets were exposed to 70° C. for four hours to eliminate any presence of moisture. Then, melt extrusion of pristine and GNP-modified nylon-6 was carried out in a DSM Micro 15 cubic centimeters (cc) Compounder (vertical, co-rotating, twin-screws micro-extruder) operating at 260° C. for 3 min at a screw speed of 100 revolutions per minute (rpm). The melted material was then directly transferred in to a DACA Micro-injector with the barrier temperature ($T_{barrier}$)=260° C. and the mold temperature ($T_{mold}$)=100° C. The injection pressure applied for injection molding of tensile, impact, flexural coupons and discs was around 0.97 MPa. The resulting injection molded samples were used for experimental testing and the discs were used for adhesive film production.

The discs developed from the injection molded specimens were placed between stainless steel plates covered by a high-temperature resistant polyimide film (KAPTON polyimide film; available from DUPONT) to enable ease of adhesive film removal. To control/maintain the adhesive film thickness, 0.09 millimeter (mm) thick aluminum spacers were placed between the top and bottom plates. To eliminate/reduce entrapped air, the entire setup was covered by a vacuum bag and subjected to vacuum pressure of 1 atmosphere (atm). While maintaining the vacuum pressure, the plates were heated at a rate of 5 degrees Centigrade per minute (° C./min) for up to 260° C., followed by an isothermal process for 5 min. In order to obtain the desired film thickness, successive pressures of 30, 60, and 90 MPa were applied on the plates with a time interval of 3-5 min. Inconsistent film thickness was observed in some cases during film production. The applied pressure caused the plates to deflect and consequently the central portion of the adhesive film was reduced. To minimize the deflection, additional spacers were also placed at the center.

Tensile and flexural tests were performed using a universal testing system (UTS) electro-mechanical equipment. All tests were performed at room temperature and the results reported here are the average of a minimum of five specimens per case. The tensile tests were performed according to ASTM D638. A 1000 pound (lb) (454 kilogram (kg)) standard load cell attached to the UTS frame and external laser extensometer were used to measure applied force and resulting longitudinal strain, respectively. Flexural tests (three-point bending mode) were performed according to the ASTM D770-10 on the same machine with a load cell of 100 lb. (45.4 kg). The dimensions of the samples for flexural tests were 62.7 mm×12.24 mm×3.2 mm. The span length was set at 50.8 mm. The crosshead speed was calculated based on specimen geometry, according to ASTM standard, and was set at 0.05 inches per minute (in/min) A linear variable differential transformer (LVDT) was used to measure the deflection in flexural tests Impact resistance tests (Izod type) were carried out according to ASTM D256 standard test. The dimensions of the samples for impact resistance tests were 62.7 mm×10.72 mm×3.91 mm cross-sectional area at the mid-notch.

Figure 8:
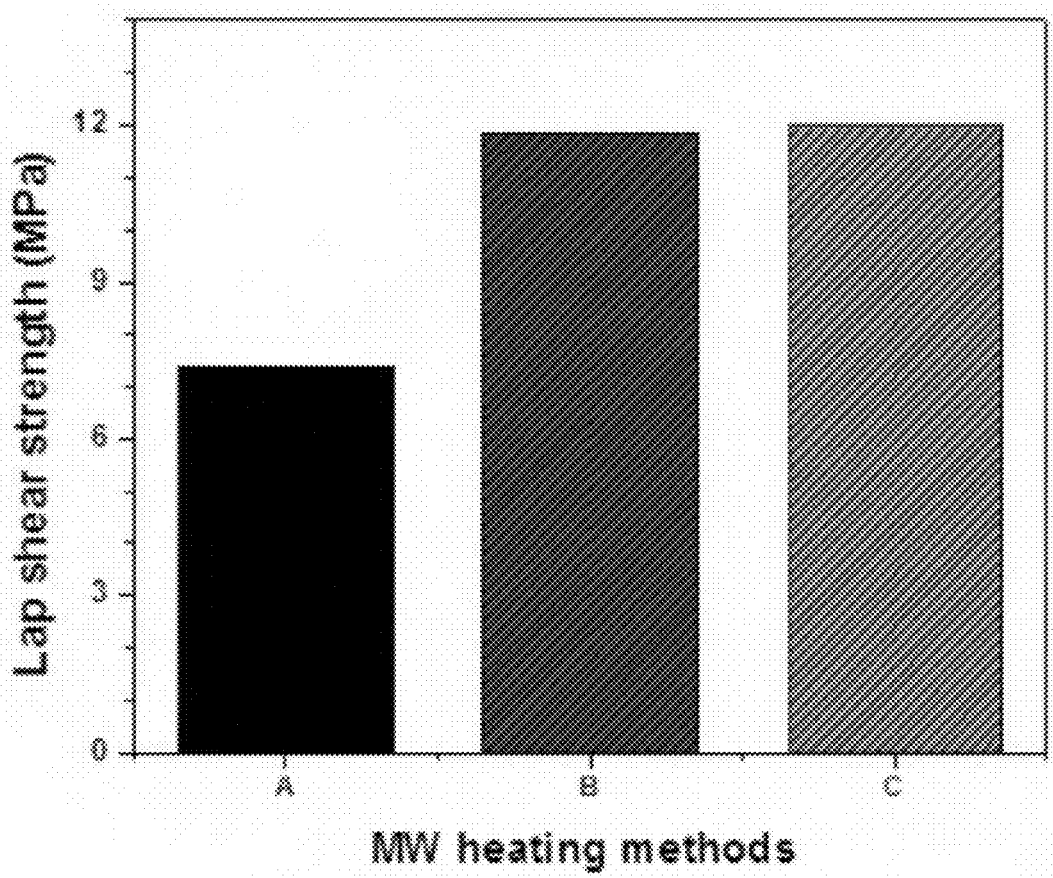
FIG. 8 is a graph illustrating the effect of different microwave heating power, time and pressure for making nylon-6/XGNP 6 wt % adhesive lap shear joints bonded to cured epoxy plates. Conditions: A ~500 watts for 187 s at ~3 psi; B ~500 watts for 210 s at 15 psi; and C ~500 watts for 240 s at 45 psi.

FIG. 8 shows effect of MW heating, at 2.45 GHz, of a nylon-6/XGNP 6 wt. % adhesive used to bond two cured epoxy plates. Lap shear strength was evaluated with respect to varied pressure, time, and heating power. Condition A was about 500 watts for 187 seconds at about 3 psi; Condition B was about 500 watts for 210 seconds at 15 psi; and Condition C was about 500 watts for 240 seconds at 45 psi. Condition C shows the best lap shear strength among the tested samples. It suggests that once a minimum pressure is achieved (e.g., 15 psi), further increases in the bonding pressure do not affect the bond strength. The following conclusions were made: (1) Electromagnetic (2.45 GHz Microwave, MW) heating of the thermoplastic polymer (TP) exfoliated graphite nano-platelets (XGNP) nanocomposites (NC) was demonstrated independent of the adherend composition such as glass and epoxy plate in the MW. (2) A concentration of at least 10 wt. % XGNP was used to achieve sufficient conductivity to absorb the MW energy and heat the thermoplastic polymer (TP) samples faster than the neat control samples at fixed heating time of 4 minutes. (3) The lap shear strength method to fabricate and test adhesion of GF-epoxy sheet/Nylon-6/GF-epoxy sheet gave reproducible results with lap shear strength of about 11 MPa. It appears that adding XGNP to an adhesive formulation will result in a microwaveable adhesive product. The variables are time of MW heating, concentration of XGNP and the MW power level. (4) The lap shear strength to Epoxy plate by MW showed better strength than traditional heating by conventional oven heating and was similar to hot pressing methods for bonding. (5) Both bonding and un-bonding of hot melt adhesive film between the Epoxy plates by MW excitation was successful.

The MW coupling was successfully used to activate the thermoplastic adhesive, thereby to bond and un-bond composite-composite lap-joints. This poses a minimal risk with respect to interaction of the metal adherends with MW activation. Considering it is a non-contact technique, this risk can be easily overcome by activating the adhesives from the non-metallic adherend side of the dissimilar material joint.

Vehicle application/advantages: The United States Department of Transportation (USDoT) researchers have reported that a reduction in 10% in mass can improve fuel efficiency by 6.5%. The adhesive composition uses the benefits of adhesive bonded joining technology which is commonly agreed to produce the highest amount of structural weight reduction among all existing joining techniques. Hence, it is estimated that the disclosed adhesive composition has potential for maximum weight reduction. The reduction in structural weight is directly linked to reduced fuel consumption, which indirectly results in fewer emissions of greenhouse gases. Hence, the potential of the adhesive composition to maximize weight reduction has potential to considerably reduce greenhouse gas emissions. The adhesive composition for dissimilar material joining has many advantages including but not limited to a) light-weight and b) reparability/re-assembly. The increased fuel-efficiency has both economic and environmental appeal to the end-user. Additionally, bonded components sustaining minimal damage are generally completely replaced as they are incapable of repair. The adhesive composition allows in-service repair/bonding/un-bonding, thereby providing an economic benefit to the end-user. The adhesively bonded technique is commonly accepted in current industrial practices. The only limiting factor has been the inability to re-assemble or repair. Since the adhesive composition allows re-assembly and repair along with inheriting all the benefits of bonded joining technique, it can be implemented in the automotive industry with minimal to negligible changes in current assembly line practices.

This example demonstrates the feasibility of structural joining with repeatable bonding characteristics. It uses the functionality of GnP to couple with MW radiations. The addition of GNP in adhesives also provides enhancements in stiffness-toughness balance and improved resistance to damage of resulting multi-material joints.

Example 2

This example illustrates the application of a variable frequency microwave (VFM) for effective bonding and de-bonding of a glass fiber composite by specifically targeting and coupling to the XGNP-reinforced nylon film material (3 wt. % XGNP in polyamide-6 as in Example 1) which is sandwiched between two similar composite specimens, without causing damage or burning of the composites. Six composite specimens, three for bonding and three for de-bonding, were provided for this initial process. The material had a film thickness of about 0.127 mm. The composite/material assembly was about 25.4 mm×100 mm, with an approximate overall thickness of 10.33 mm.

For bonding, each individual sample was placed inside a MICROCURE2100 VFM cavity on a quartz stand. The MICROCURE2100 VFM apparatus (available from Lambda Technologies, Morrisville, N.C.) provides a variable frequency microwave from 5.8 GHz to 7.0 GHz at 400 W, 700 W power. A fiber optic contact probe was attached to the bond-line region of assembly. Quartz rods weighing about 125 g each, were used to provide process hold-down weight. A four-step VFM profile was used: Ramp 2° C./sec to 100° C. and hold for 1 min; ramp 1.5° C./sec to 115° C. and hold for 1 min; ramp 1° C./sec to 150° C. and hold for 2 min; and ramp 0.5° C./sec to 230° C. and hold for 4 min. The bonded samples were tested for shear strength, which was found to be about 6.2 MPa, which was similar to or higher than comparable thermally bonded sample parts: about 6.1 MPa (5 wt. % XGNP in polyamide-6), about 6.1 MPa (3 wt. % XGNP in polyamide-6), about 2.8 MPa (1 wt. % XGNP in polyamide-6), and about 2.4 MPa (polyamide-6 without XGNP).

For de-bonding, each individual sample was placed inside the MC2100 VFM cavity on a quartz stand. A fiber optic contact probe was attached to the bond-line region of assembly. Three quartz rods weighing about 125 g each, were used to provide counter weight. A two-step VFM profile was used: Ramp 2° C./sec to 100° C. and hold for 1 sec; and ramp 0.5° C./sec to 240° C. and hold for 1 min. However, in all three cases, de-bonding appeared to have occurred as temperature approached approximately 235° C.

Example 3

Figure 9:
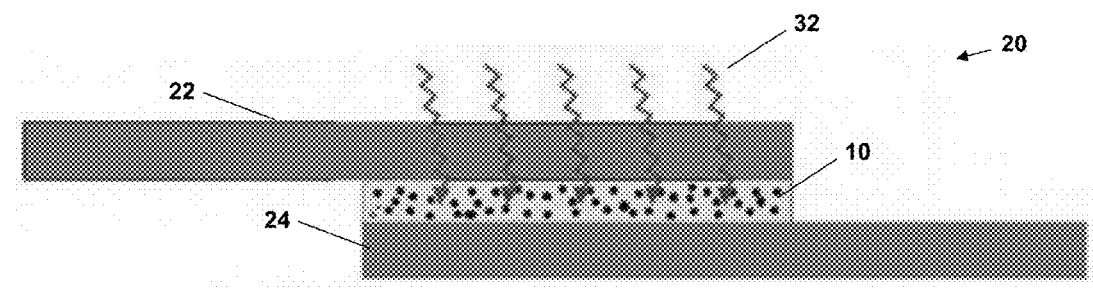
FIG. 9 is a side cross-sectional view of an assembled in-plane lap-joint part incorporating an adhesive composition according to the disclosure including ferromagnetic nanoparticles electromagnetically excitable particles.

This example illustrates an adhesive composition according to the disclosure using selected thermoplastic adhesives and commercially available ferromagnetic nanoparticles (FMNPs) as the electromagnetically excitable particles. The selected ferromagnetic nanoparticles are embedded in thermoplastic adhesives to evaluate their thermal response while they are subjected to external electromagnetic field (using induction heating process). Appropriate ranges of frequency of alternating current (AC), power, and concentration of FMNPs are chosen based on past experience and available literature for the selected adhesive materials in order to provide electromagnetic induction heating. Corresponding factors such as joining techniques, geometries, and repetitive re-assembly parameters are considered as exploration parameters to improve the performance the joints. Furthermore, advanced deformation measurement and damage evaluation techniques such as laser, optical and SEM method are used to aid the study, to fully understand the behavior of adhesive joints under different loading conditions. A schematic diagram of the adhesive composition 10, assembled part 20, and the experimental heating setup applying electromagnetic radiation 32 is shown in FIG. 9.

The thermal, mechanical and chemical behavior of polymeric materials are highly influenced when nano-fillers are incorporated in the matrices. Particularly, the incorporation of nanoparticles in adhesives introduces multi-functionality to the resulting bonded joints with enhancements in multiple properties including mechanical (stiffness, strength), fracture (delamination resistance, energy absorption), thermal and moisture diffusion properties along with value-added properties such as electromagnetic interaction, etc. In the automotive industry, environmental, fuel economy and safety regulations have driven companies to develop high performance, lightweight and multifunctional materials. Nano-filler-modified polymeric materials in the form of an adhesive composition as disclosed herein can provide significant benefits to an assembled automotive part. Nano-fillers allow the host material to tailor the desired properties such as mechanical, thermal, and electromagnetic/chemical interactions that would enhance the design space of the material eventually leading to obtain an optimal multifunctional material.

In this example, FMNPs are embedded in the thermoplastic adhesive to develop efficient, simple, inexpensive and reversible adhesively bonded joints for multi-material joining. These adhesive compositions can optimize the bonding process thereby offering new opportunities related to cost reduction, improved resistance to applied loads, easy and rapid dismantling and smart recycling, which are desirable factors in product development for automotive applications.

In this example, prior to the melt extrusion process, the as-received thermoplastic adhesive (polyamide-/nylon-6 as in Example 1) was processed with a hot plate machine to obtain a 2-mm thick film that would eventually be shredded to small pieces. Then FMNPs (50 μm $Fe_2O_3$ particles) were mixed manually with shredded adhesive material. Then the melt extrusion of pristine and FMNP-modified adhesive was carried out in a DSM MICRO 15 cubic centimeters (cc) compounder (vertical, co-rotating, twin-screws micro-extruder) operating at 190° C. for 2 min at a screw speed of 100 revolutions per minute (rpm).

The pristine and FMNP-modified bulk adhesives were placed between stainless steel plates covered by a high-temperature resistant polyimide film (KAPTON polyimide film; available from DUPONT) to enable ease of adhesive film removal. To control/maintain the adhesive film thickness, 0.5 millimeter (mm) thick aluminum spacers were placed between the top and bottom plates. Then, the plates were heated at 190° C., followed by an isothermal process for 5 min. In order to obtain the desired film thickness, successive pressures of 1, 3, and 5 tons were applied on the plates with a time interval of 3-5 min.

Figure 10:
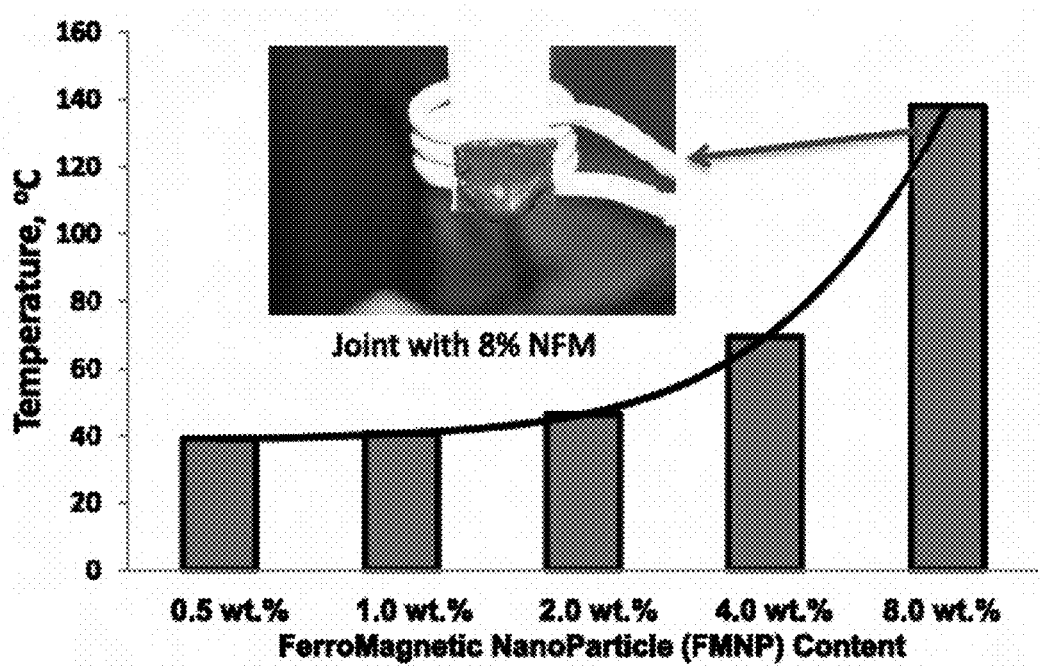
FIG. 10 is a graph illustrating the peak temperature achievable in an adhesive composition according to the disclosure including ferromagnetic nanoparticles as a function of nanoparticle loading.

Prior to activation of induction heating in the adhesive composition, a fiber Bragg grating (FBG) sensor was embedded in the FMNP-modified adhesively bonded joint to measure the temperature rise inside the adhesive/joint due to the presence of FMNPs. With an applied power of 6 kW for 60 seconds, the induction heating coil generates an electromagnetic field around the joint that interacts with the embedded FMNPs and causes a rise in temperature of the FMNP-modified adhesive at the joint interface. Generally, as illustrated in FIG. 10, the presence of FMNPs in the adhesive was found to increase the thermal response of the thermoplastic adhesive while it is subjected to the electromagnetic fields. As observed at lower concentrations of about 0.5-2 wt. % FMNP in this example, the thermal response of the thermoplastic adhesive is insignificant. FIG. 10 shows the exponential increase in temperature with increasing FMNP concentrations with all other parameters (power, frequency, exposure time) being maintained constant, with a peak temperature in the thermoplastic adhesive of about 135° C. at 8 wt. % FMNP in the nylon matrix.

In this example, single lap adhesively bonded joints were experimentally characterized according to ASTM D3163. The lap-shear strengths of pristine polyamide-6, and 8 wt. % FMNP in polyamide-6 were measured at 1.2 MPa and 5.2 MPa, respectively. It was observed that FMNP inclusions in the adhesive significantly enhance the shear strength of resulting joints. The lap-shear strengths containing 8 wt. % FMNP had better properties than similar class of adhesives, thereby showing promise for further exploration and wide range of applications.

Because other modifications and changes varied to fit particular operating requirements and environments will be apparent to those skilled in the art, the disclosure is not considered limited to the examples chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

FIGURES PARTS LIST 10 adhesive composition
12 thermoplastic polymer (e.g., thermoplastic polymer adhesive)
14 electromagnetically excitable particles (14A particulate and/or semi-spherical particles; 14B plate or rod-like particles)

20 part to be assembled, disassembled, repaired, etc.
21 joint interface
22 first substrate (22A first surface thereof)
24 second substrate (24A second surface thereof)
26 third substrate (26A third surface thereof)
28 cracks or defects
30 electromagnetic radiation source (e.g., microwave, electromagnet)
32 electromagnetic radiation
42 engaging force or pressure
44 disengaging or separation force

What is claimed is:

1. A method for disassembling a part, the method comprising:
   (a) providing an assembled part comprising an adhesive composition comprising (i) a thermoplastic polymer matrix, and (ii) electromagnetically excitable particles distributed throughout the thermoplastic polymer matrix, the adhesive composition being in a solid state and in contact with and bonded to a first surface and a second surface at a joint interface of the assembled part;
   (b) directing electromagnetic radiation to the adhesive composition to heat the adhesive composition and to transform the adhesive composition to a flowable or moldable state, wherein heating of the adhesive composition does not exceed a thermal degradation temperature of the thermoplastic polymer in the adhesive composition; and
   (c) separating the first surface from the second surface.

2. The method of claim 1, further comprising:
   (d) re-contacting the adhesive composition with the first surface and the second surface at the joint interface, directing electromagnetic radiation to the adhesive composition to heat the adhesive composition and to transform the adhesive composition to flowable or moldable state, and removing the electromagnetic radiation and cooling the adhesive composition, thereby transforming the adhesive composition to a solid state in contact with and bonded to the first surface and the second surface at the joint interface.

3. The method of claim 1, further comprising:
   (d) providing a third surface as a replacement for the second surface; and
   (e) contacting the adhesive composition with the first surface and the third surface at the joint interface, directing electromagnetic radiation to the adhesive composition to heat the adhesive composition and to transform the adhesive composition to flowable or moldable state, and removing the electromagnetic radiation and cooling the adhesive composition, thereby transforming the adhesive composition to a solid state in contact with and bonded to the first surface and the third surface at the joint interface.

4. The method of claim 3, wherein the third surface has the same shape and/or is formed from the same material as the second surface.

5. The method of claim 1, wherein:
   (i) the electromagnetically excitable particles comprise a carbon material; and
   (ii) the electromagnetic radiation comprises microwave radiation.

6. The method of claim 1, wherein:
   (i) the electromagnetically excitable particles comprise a metallic material; and
   (ii) the electromagnetic radiation comprises a variable magnetic field generating electromagnetic induction.

7. The method of claim 1, wherein:
   (i) the electromagnetically excitable particles comprise at least one a carbon material and at least one metallic material; and
   (ii) the electromagnetic radiation comprises at least one of microwave radiation and a variable magnetic field generating electromagnetic induction.

8. The method of claim 1, wherein:
   (i) the first surface is a surface of a first substrate;
   (ii) the second surface is a surface of a second substrate separate from the first substrate.

9. The method of claim 1, wherein the first surface and the second surface are surfaces of a single substrate.

10. The method of claim 1, wherein the first surface and the second surface are formed from different materials.

11. The method of claim 10, wherein the first surface comprises a metal material, and the second surface comprises a polymeric material.

12. The method of claim 1, wherein the thermoplastic polymer is selected from the group consisting of polyamides, polyesters, polyurethanes, acrylonitrile-butadiene-styrene (ABS) copolymers, styrene block copolymers, polycarbonates, polyolefins, ethylene-vinyl acetate copolymers, ethylene-acrylate copolymers, and combinations thereof.

13. The method of claim 1, wherein the thermoplastic polymer is in a solid state at a temperature ranging from 20°C. to 30°C.

14. The method of claim 1, wherein the thermoplastic polymer is present in the adhesive composition in an amount ranging from 50 wt. % to 99.9 wt. %.

15. The method of claim 1,, wherein the electromagnetically excitable particles comprise a chemical functionalization moiety for compatibilization with the thermoplastic polymer matrix.

16. The method of claim 1, wherein the electromagnetically excitable particles comprise one or more of a carbon material and a metallic material.

17. The method of claim 1, wherein the electromagnetically excitable particles comprise at least one carbon material and at least one metallic material.

18. The method of claim 1, wherein the electromagnetically excitable particles are selected from the group consisting of ferromagnetic nanoparticles, graphene nanoplatelets, alumina nanoparticles, metal-doped graphene microparticles, metal-doped graphene nanoparticles, and combinations thereof.

19. The method of claim 1, wherein the electromagnetically excitable particles comprise carbon.

20. The method of claim 19, wherein the electromagnetically excitable particles are selected from the group consisting of graphite particles, exfoliated graphite nanoplatelets, carbon nanotubes, carbon fibers, carbon black, and combinations thereof.

21. The method of claim 1, wherein the electromagnetically excitable particles comprise ferromagnetic nanoparticles.

22. The method of claim 1, wherein the electromagnetically excitable particles are present in the adhesive composition in an amount ranging from 0.1 wt. % to 20 wt. %.

23. The method of claim 1, wherein the electromagnetically excitable particles comprise nanoparticles having a size ranging from 1 nm to 1000 nm.

24. The method of claim 1, wherein the electromagnetically excitable particles comprise microparticles having a size ranging from 1 μm to 100 μm.

25. The method of claim 1, wherein the adhesive composition further comprises: one or more additives selected from the group consisting of tackifying resins, waxes, plasticizers, antioxidants, ultraviolet stabilizers, colorants, biocides, flame retardants, antistatic agents, fillers, and combinations thereof.

26. The method of claim 25, wherein the additives are present in the adhesive composition in an amount ranging from 0.5 wt. % to 40 wt. %.

* * * * *